US012706657B2

(12) United States Patent
Li et al.

(10) Patent No.: US 12,706,657 B2
(45) Date of Patent: Aug. 11, 2026

(54) COMMUNICATION METHOD AND APPARATUS

(71) Applicant: HUAWEI TECHNOLOGIES CO., LTD., Shenzhen (CN)

(72) Inventors: Kuikui Li, Shanghai (CN); Qinghai Zeng, Shenzhen (CN); Fei Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 18/675,847

(22) Filed: May 28, 2024

(65) Prior Publication Data

US 2024/0313845 A1 Sep. 19, 2024

Related U.S. Application Data

(63) Continuation of application No. PCT/CN2022/131966, filed on Nov. 15, 2022.

(30) Foreign Application Priority Data

Nov. 29, 2021 (CN) ........................ 202111432913.7

(51) Int. Cl.
*H04B 7/06* (2006.01)
*H04B 7/155* (2006.01)

(52) U.S. Cl.
CPC ......... *H04B 7/0695* (2013.01); *H04B 7/0639* (2013.01); *H04B 7/15507* (2013.01)

(58) Field of Classification Search
CPC . H04B 7/0695; H04B 7/0639; H04B 7/15507
See application file for complete search history.

(56) References Cited

U.S. PATENT DOCUMENTS

| | | | | |
|---|---|---|---|---|
| 2021/0036762 | A1* | 2/2021 | Abedini | H04B 7/15528 |
| 2021/0037486 | A1* | 2/2021 | Li | H04W 24/08 |
| 2021/0127368 | A1* | 4/2021 | Abedini | H04L 5/0053 |
| 2024/0349074 | A1* | 10/2024 | Miao | H04B 17/40 |
| 2024/0381386 | A1* | 11/2024 | Li | H04B 7/06952 |
| 2024/0413888 | A1 | 12/2024 | Abedini et al. | |
| 2025/0070846 | A1* | 2/2025 | Wu | H04B 7/0695 |
| 2025/0202552 | A1* | 6/2025 | Ban | H04W 72/0446 |

FOREIGN PATENT DOCUMENTS

| | | |
|---|---|---|
| CN | 110958620 A | 4/2020 |

OTHER PUBLICATIONS

3GPP TS 38.331 V15.5.0, 3rd Generation Partnership Project; Technical Specification Group Radio Access Network; NR; Radio Resource Control (RRC) protocol specification (Release 15), Mar. 2019, total 491 pages.

* cited by examiner

*Primary Examiner* — Jaison Joseph
(74) *Attorney, Agent, or Firm* — Slater Matsil, LLP

(57) ABSTRACT

In accordance with an embodiment, a method includes receiving node configuration information and a first beam set of a first node from the first node; and forwarding the first beam set to form a second beam set of a second node based on the node configuration information, wherein the first beam set and the second beam set each comprise at least one beam.

20 Claims, 12 Drawing Sheets

User plane UP:

Control plane CP:

RRC: radio resource control
RLC: radio link control
PHY: physical layer
PDCP: packet data convergence protocol
MAC: media access control
SDAP: service data adaptation protocol
RU: radio frequency unit in the second node
MT: mobile terminal in the second node User plane UP:

Second node

RU MT

First node

SDAP: service data adaptation protocol

RLC: radio link control

PHY: physical layer

PDCP: packet data convergence protocol

MAC: media access control

RU: radio frequency unit in the second node

MT: mobile terminal in the second node

Control plane CP:

Second node

First node (a)

First node (b)

Second node

First node (c)

RRC: radio resource control

RLC: radio link control

PHY: physical layer

PDCP: packet data convergence protocol

MAC: media access control

RU: radio frequency unit in the second node

MT: mobile terminal in the second node

COMMUNICATION METHOD AND APPARATUS

CROSS-REFERENCE TO RELATED APPLICATIONS

This application is a continuation of International Application No. PCT/CN2022/131966, filed on Nov. 15, 2022, which claims priority to Chinese Patent Application No. 202111432913.7, filed on Nov. 29, 2021. The disclosures of the aforementioned applications are hereby incorporated by reference in their entireties.

TECHNICAL FIELD

This application relates to the field of communication technologies, and in particular, to a communication method and apparatus.

BACKGROUND

Coverage is a basic function of a cellular network, and deploying a relay node in an area with poor signal coverage can expand network coverage. A conventional repeater includes a radio frequency unit (RU) module. Adaptive beamforming (BF) is not performed on a user access side, but static beamforming in a fixed direction is usually used and manually managed. A smart repeater (SR) can implement a signal amplification and forwarding operation, for example, support uplink and downlink sensing and dynamic time division duplex (TDD), bandwidth configurations, beam sensing, access side beamforming (BF), uplink (UL) or downlink (DL) forwarding power control, and dynamic switching. Especially in frequency range 2 (FR2) frequency bands defined in a 5G new radio (NR) standard or a 3rd generation partnership project (3GPP), the SR has an adaptive BF capability, and is also different from the conventional repeater in architecture. In addition to the RU module, the SR further includes an independent mobile terminal (MT) module, which is newly added to receive and feed back control signaling from a base station. However, current research on the SR still lacks corresponding protocol standards in many aspects, for example, design of a protocol stack, initial access, and authentication design of the SR, updates of system information (SI) after introduction of the SR, ways of how a network device sends control information to the SR, and configurations included in the control information.

SUMMARY

Embodiments of this application disclose a communication method and apparatus, so that the method can be applied to a smart repeater, to implement smart beam forwarding by the repeater.

A first aspect of embodiments of this application discloses a communication method, including:

A first node generates node configuration information.

The first node sends the node configuration information to a second node, where the node configuration information is used for conversion of a first beam set of the first node into a second beam set of the second node, and the first beam set and the second beam set each include at least one beam.

The first node sends the first beam set.

In the foregoing method, the first node generates the node configuration information and sends the node configuration information to the second node. Correspondingly, the second node may perform configuration based on the node configuration information. This method is applied to a smart repeater for smart beam forwarding.

In a possible implementation, a beam multiplexing mode in the first beam set includes time division multiplexing or frequency division multiplexing, and a beam multiplexing mode in the second beam set includes spatial division multiplexing. In a spatial division multiplexing mode, energy of different beams in the second beam set can be aggregated in different spatial directions.

In another possible implementation, the node configuration information includes at least one of the following: forwarding configuration information, power control information, control information occasion information, N sets of beamforming parameter information supported by the second node, and frequency band amplification and suppression information of the second node, where N is greater than or equal to 1, the control information occasion information indicates a time-frequency resource location at which the first node sends control information to the second node, the beamforming parameter information includes one or more of a phase offset, an amplitude, and an index, and the index indicates the phase offset and/or an amplitude parameter.

In the foregoing method, the first node sends the node configuration information to the second node. Correspondingly, after receiving the node configuration information from the first node, the second node may set, based on the power control information, parameters such as uplink and downlink forwarding power of the second node, and a passband bandwidth, a gain, and possible stopband suppression of a filter module, to better forward each beam in the second beam set. The second node may alternatively detect, at an indicated time-frequency location based on the control information occasion information and an indicated monitoring periodicity, a control signal delivered by the first node, and the second node is also indicated not to blindly forward the control signal sent by the first node to the second node.

In another possible implementation, the forwarding configuration information includes at least one of the following: forwarding start time information, first duration information, first indication information, time forwarding pattern information of the second node, and direction forwarding pattern information of the second node.

The first duration information indicates use duration of a first beamforming parameter, the use duration of the first beamforming parameter is equal to sending duration of a first beam in the second beam set, the first indication information indicates a quantity of beams in the second beam set, the time forwarding pattern information of the second node indicates a time location of a forwarded beam in the second beam set, and the direction forwarding pattern information of the second node indicates a beamforming parameter used for forwarding each beam in the second beam set.

In the foregoing method, the first node sends the node configuration information to the second node. Correspondingly, after receiving the node configuration information from the first node, based on the forwarding configuration information, the second node may alternatively be configured to forward each beam in the second beam set from indicated forwarding start time, at a unit interval indicated by the time forwarding pattern information, based on the use duration indicated by the first duration information, and by using the BF parameter indicated by the direction forwarding pattern information.

In another possible implementation, the quantity of the beams in the second beam set is equal to a quantity of sets of beamforming parameters used by the second node, and the quantity of sets of the beamforming parameters used by the second node is less than or equal to N.

In another possible implementation, the forwarding start time information includes identifier information of a first beam in the first beam set, or a first interval and start orthogonal frequency division multiplexing symbol information. The identifier information of the first beam indicates that forwarding starts from time corresponding to the first beam, the first interval indicates a quantity of slots between a slot in which the node configuration information is received and a forwarding start slot, and the start orthogonal frequency division multiplexing symbol information indicates a forwarding start orthogonal frequency division multiplexing symbol in the forwarding start slot.

In another possible implementation, the first indication information includes at least one of the following: a subcarrier spacing, a frequency band, cell identifier information, and K, where K is greater than or equal to 1.

In another possible implementation, the node configuration information is carried in radio resource control layer signaling, downlink control information of a physical downlink control channel, or a media access control control element.

In the foregoing method, the node configuration information is carried in the RRC layer signaling, the DCI, or the MAC CE, so that signaling overheads can be reduced.

In another possible implementation, the method further includes: The first node generates system information, where the system information includes index information of the at least one beam in the first beam set. The first node sends the system information.

In another possible implementation, the method further includes: The first node sends system information change indication information to the second node.

In another possible implementation, the method further includes: The first node continuously sends beams in the first beam set in time.

In another possible implementation, the method further includes: The first node determines, based on forwarding capability information of the second node, that a quantity of sets of beamforming parameters supported by the second node is N, or determines, in different subcarrier spacings and/or different frequency bands, quantities of sets of beamforming parameters supported by the second node.

In another possible implementation, the quantity of sets of the beamforming parameters supported by the second node is greater than or equal to the quantity of the beams in the second beam set or the quantity of sets of the beamforming parameters used by the second node.

In another possible implementation, a first node receives a first message from a second node, where the first message is for requesting to establish a radio resource control connection, the first message includes second indication information, and the second indication information indicates that a terminal that initiates the request is the second node. The first node sends a second message to the second node.

In the foregoing method, in the foregoing manner, initial access of the second node can be completed, a signaling procedure is simplified, and signaling overheads are reduced.

In another possible implementation, the first message includes third indication information, and the third indication information indicates identifier information of the second node.

In another possible implementation, the first message includes third indication information, and the third indication information indicates capability information of the second node.

In another possible implementation, the third indication information includes an information field, and a structure corresponding to the information field is used to define the capability information of the second node.

In another possible implementation, the third indication information includes a bit sequence, and the bit sequence indicates the capability information of the second node.

In another possible implementation, the third indication information includes an index value, and the index value indicates the capability information of the second node.

In another possible implementation, the second message includes a first value, and the first value is used to verify identity information of the second node.

In another possible implementation, the method further includes: The first node receives a third message from the second node, where the third message includes a first response number. The first node obtains a public key of the second node, where the public key is preconfigured by a network management function network element or is requested by the first node from a network management function network element. The first node verifies the first response number based on the first value and the public key, to determine the identity information of the second node.

In another possible implementation, the third message includes capability information of the second node.

In another possible implementation, the method further includes: The first node sends a capability inquiry message to the second node. The first node receives the capability information of the second node from the second node.

In another possible implementation, a first node receives capability information from a second node, where the capability information includes forwarding capability information of the second node.

In another possible implementation, the capability information further includes one or more of the following: a specification of the second node, frequency band amplification and suppression information of the second node, and maximum uplink and downlink transmit power of the second node.

In another possible implementation, the forwarding capability information of the second node includes one or more of the following: a maximum quantity of beams capable of being forwarded by the second node, quantities of beams forwarded by the second node in different subcarrier spacings and/or different frequency bands, and the different subcarrier spacings and/or the different frequency bands supported by the second node.

In another possible implementation, a first node sends, to a second node, physical random access channel configuration information dedicated to the second node, where the physical random access channel configuration information includes a first preamble. The first node receives the first preamble from the second node.

In another possible implementation, the physical random access channel configuration information further includes a time-frequency domain location of a physical random access channel resource. That the first node receives the first preamble from the second includes: The first node receives the preamble from the second node at the time-frequency domain location of the physical random access channel resource.

In another possible implementation, a first node sends, to a second node, physical random access channel configuration information dedicated to the second node, where the physical random access channel configuration information includes a time-frequency domain location of a physical random access channel resource. The first node receives the preamble from the second node at the time-frequency domain location of the physical random access channel resource.

A second aspect of embodiments of this application discloses a communication method, including:

A second node receives node configuration information and a first beam set of a first node from the first node.

The second node converts the first beam set into a second beam set of the second node based on the node configuration information, where the first beam set and the second beam set each include at least one beam.

The second node sends the second beam set.

In a possible implementation, that the second node converts the first beam set into a second beam set of the second node based on the node configuration information includes: The second node determines, based on the node configuration information, to forward the first beam set to form the second beam set of the second node.

In another possible implementation, a beam multiplexing mode in the first beam set includes time division multiplexing or frequency division multiplexing, and a beam multiplexing mode in the second beam set includes spatial division multiplexing.

In another possible implementation, the node configuration information includes at least one of the following: forwarding configuration information, power control information, control information occasion information, N sets of beamforming parameter information supported by the second node, and frequency band amplification and suppression information of the second node, where N is greater than or equal to 1, the control information occasion information indicates a time-frequency resource location at which the second node receives control information from the first node, the beamforming parameter includes one or more of a phase offset, an amplitude, and an index, and the index indicates the phase offset and/or an amplitude parameter.

In another possible implementation, the forwarding configuration information includes at least one or more of the following: forwarding start time information, first duration information, first indication information, time forwarding pattern information of the second node, and direction forwarding pattern information of the second node. The first duration information indicates sending duration for which the second node sends a first beam in the second beam set by using a first beamforming parameter, the first indication information indicates a quantity of beams in the second beam set, and the time forwarding pattern information of the second node indicates time locations at which the second node forwards the second beam set from forwarding start time; and the direction forwarding pattern information of the second node indicates beamforming parameters used by the second node to forward the second beam set.

In another possible implementation, the quantity of the beams in the second beam set is equal to a quantity of sets of beamforming parameters used by the second node, and the quantity of sets of the beamforming parameters used by the second node is less than or equal to N.

In another possible implementation, the forwarding start time information includes identifier information of a first beam in the first beam set, or a first interval and start orthogonal frequency division multiplexing symbol information. The identifier information of the first beam indicates that the second node starts to forward the second beam set from time corresponding to the first beam, the first interval indicates a quantity of slots between a slot in which the second node receives the node configuration information and a forwarding start slot, and the start orthogonal frequency division multiplexing symbol information indicates a forwarding start orthogonal frequency division multiplexing symbol in the forwarding start slot.

In another possible implementation, the first indication information includes at least one of the following: a subcarrier spacing, a frequency band, cell identifier information, and K, where K is greater than or equal to 1.

In another possible implementation, the time forwarding pattern information of the second node includes a first bitmap, and a bit in the first bitmap corresponds to a unit interval. When a value of a bit in the first bitmap is a first preset value, the second node forwards a beam in the second beam set at a unit interval corresponding to the bit.

In another possible implementation, the direction forwarding pattern information of the second node includes a second bitmap, and a bit in the second bitmap corresponds to a set of beamforming parameters. When a value of a bit in the second bitmap is a second preset value, the second node forwards a beam in the second beam set by using a set of BF parameters corresponding to the bit.

In another possible implementation, the control information occasion information includes at least one of the following: a time periodicity, a frequency domain resource block, a quantity of occupied orthogonal frequency division multiplexing symbols, and a time start location.

In another possible implementation, the node configuration information is carried in radio resource control layer signaling, downlink control information of a physical downlink control channel, or a media access control control element.

In another possible implementation, the method further includes: The second node receives system information from the first node, where the system information includes index information of the at least one beam in the first beam set.

In another possible implementation, the method further includes: The second node receives system information change indication information from the first node.

In another possible implementation, the method further includes: The second node continuously receives beams in the first beam set in time.

In another possible implementation, a control plane protocol stack of the second node includes a radio resource control layer, a media access control layer, and a physical layer.

In another possible implementation, a second node sends a first message to a first node, where the first message is for requesting to establish a radio resource control connection, the first message includes second indication information, and the second indication information indicates that a terminal that initiates the request for establishing the radio resource control connection is the second node. The second node receives a second message from the first node. The second node establishes the radio resource control connection to the first node based on the second message.

In another possible implementation, the first message includes third indication information, and the third indication information indicates identifier information of the second node.

In another possible implementation, the first message includes third indication information, and the third indication information indicates capability information of the second node.

In another possible implementation, the third indication information includes an information field, and a structure corresponding to the information field is used to define the capability information of the second node.

In another possible implementation, the third indication information includes a bit sequence, and the bit sequence indicates the capability information of the second node.

In another possible implementation, the third indication information includes an index value, and the index value indicates the capability information of the second node.

In another possible implementation, the second message includes a first value, and the method further includes: The second node generates a first response number based on the first value and a private key in a digital certificate. The second node sends a third message to the first node, where the third message includes the first response number, and the first response number is used by the first node to verify identity information of the second node.

In another possible implementation, the third message includes capability information of the second node.

In another possible implementation, the method further includes: The second node receives a capability inquiry message from the first node. The second node sends the capability information of the second node to the first node.

In another possible implementation, a second node sends capability information of the second node to a first node, where the capability information includes forwarding capability information of the second node.

In another possible implementation, the capability information further includes one or more of the following: a specification of the second node, frequency band amplification and suppression information of the second node, and maximum uplink and downlink transmit power of the second node.

In another possible implementation, the forwarding capability information of the second node includes one or more of the following: a maximum quantity of beams capable of being forwarded by the second node, quantities of beams forwarded by the second node in different subcarrier spacings and/or different frequency bands, and the different subcarrier spacings and/or the different frequency bands supported by the second node.

In another possible implementation, a second node receives, from a first node, physical random access channel configuration information dedicated to the second node, where the physical random access channel configuration information includes a first preamble. The second node sends the first preamble to the first node.

In another possible implementation, the physical random access channel configuration information further includes a time-frequency domain location of a physical random access channel resource. That the second node sends the first preamble to the first node includes: The second node sends the preamble to the first node at the time-frequency domain location of the physical random access channel resource.

In another possible implementation, a second node receives, from a first node, physical random access channel configuration information dedicated to the second node, where the physical random access channel configuration information includes a time-frequency domain location of a physical random access channel resource. The second node sends a preamble to the first node at the time-frequency domain location of the physical random access channel resource.

A third aspect of embodiments of this application discloses a communication method, including:

A second node sends a first message to a first node, where the first message is for requesting to establish a radio resource control connection, the first message includes first indication information, and the first indication information indicates that a terminal that initiates the request for establishing the radio resource control connection is the second node.

The second node receives a second message from the first node.

The second node establishes the radio resource control connection to the first node based on the second message.

In the foregoing method, in the foregoing manner, initial access of the second node can be completed, a signaling procedure is simplified, and signaling overheads are reduced.

In a possible implementation, the first message includes second indication information, and the second indication information indicates identifier information of the second node.

In another possible implementation, the first message includes second indication information, and the second indication information indicates capability information of the second node.

In another possible implementation, the second indication information includes an information field, and a structure corresponding to the information field is used to define the capability information of the second node.

In another possible implementation, the second indication information includes a bit sequence, and the bit sequence indicates the capability information of the second node.

In another possible implementation, the second indication information includes an index value, and the index value indicates the capability information of the second node.

In another possible implementation, the second message includes a first value, and the method further includes: The second node generates a first response number based on the first value and a private key in a digital certificate. The second node sends a third message to the first node, where the third message includes the first response number, and the first response number is used by the first node to verify identity information of the second node.

In another possible implementation, the method further includes: The third message includes capability information of the second node.

In another possible implementation, the method further includes: The second node receives a capability inquiry message from the first node. The second node sends the capability information of the second node to the first node.

In another possible implementation, a control plane protocol stack of the second node includes a radio resource control layer, a media access control layer, and a physical layer.

A fourth aspect of embodiments of this application discloses a communication method, including:

A first node receives a first message from a second node, where the first message is for requesting to establish a radio resource control connection, the first message includes first indication information, and the first indication information indicates that a terminal that initiates the request is the second node.

The first node sends a second message to the second node.

In a possible implementation, the first message includes second indication information, and the second indication information indicates identifier information of the second node.

In another possible implementation, the first message includes second indication information, and the second indication information indicates capability information of the second node.

In another possible implementation, the second indication information includes an information field, and a structure corresponding to the information field is used to define the capability information of the second node.

In another possible implementation, the second indication information includes a bit sequence, and the bit sequence indicates the capability information of the second node.

In another possible implementation, the second indication information includes an index value, and the index value indicates the capability information of the second node.

In another possible implementation, the second message includes a first value, and the first value is used to verify identity information of the second node.

In another possible implementation, the method further includes: The first node receives a third message from the second node, where the third message includes a first response number. The first node obtains a public key of the second node, where the public key is preconfigured by a network management function network element or is requested by the first node from a network management function network element. The first node verifies the first response number based on the first value and the public key, to determine the identity information of the second node.

In another possible implementation, the third message includes capability information of the second node.

In another possible implementation, the method further includes: The first node sends a capability inquiry message to the second node. The first node receives the capability information of the second node from the second node.

A fifth aspect of embodiments of this application discloses a communication method, including:

A second node sends capability information of the second node to a first node, where the capability information includes forwarding capability information of the second node.

In the foregoing method, the second node reports the capability information of the second node to the first node, so that a signaling exchange process can be simplified, and signaling overheads can be reduced.

In a possible implementation, the capability information further includes one or more of the following: a specification of the second node, frequency band amplification and suppression information of the second node, and maximum uplink and downlink transmit power of the second node.

In another possible implementation, the forwarding capability information of the second node includes one or more of the following: a maximum quantity of beams capable of being forwarded by the second node, quantities of beams forwarded by the second node in different subcarrier spacings and/or different frequency bands, and the different subcarrier spacings and/or the different frequency bands supported by the second node.

A sixth aspect of embodiments of this application discloses a communication method, including:

A first node receives capability information from a second node, where the capability information includes forwarding capability information of the second node.

In a possible implementation, the capability information further includes one or more of the following: a specification of the second node, frequency band amplification and suppression information of the second node, and maximum uplink and downlink transmit power of the second node.

In another possible implementation, the forwarding capability information of the second node includes one or more of the following: a maximum quantity of beams capable of being forwarded by the second node, quantities of beams forwarded by the second node in different subcarrier spacings and/or different frequency bands, and the different subcarrier spacings and/or the different frequency bands supported by the second node.

A seventh aspect of embodiments of this application discloses a communication method, including:

A second node receives, from a first node, physical random access channel configuration information dedicated to the second node, where the physical random access channel configuration information includes a first preamble.

The second node sends the first preamble to the first node.

In the foregoing method, the first node configures the dedicated physical random access channel configuration information for the second node, where the configuration information includes the first preamble. Correspondingly, in a manner in which the second node sends the first preamble to the first node, signaling overheads can be reduced.

In a possible implementation, the physical random access channel configuration information further includes a time-frequency domain location of a physical random access channel resource, and that the second node sends the first preamble to the first node includes: The second node sends the preamble to the first node at the time-frequency domain location of the physical random access channel resource.

An eighth aspect of embodiments of this application discloses a communication method, including:

A first node sends, to a second node, physical random access channel configuration information dedicated to the second node, where the physical random access channel configuration information includes a first preamble.

The first node receives the first preamble from the second node.

In a possible implementation, the physical random access channel configuration information further includes a time-frequency domain location of a physical random access channel resource. That the first node receives the first preamble from the second includes: The first node receives the preamble from the second node at the time-frequency domain location of the physical random access channel resource.

A ninth aspect of embodiments of this application discloses a communication method, including:

A second node receives, from a first node, physical random access channel configuration information dedicated to the second node, where the physical random access channel configuration information includes a time-frequency domain location of a physical random access channel resource.

The second node sends the preamble to the first node at the time-frequency domain location of the physical random access channel resource.

In the foregoing method, the first node configures the dedicated physical random access channel configuration information for the second node, where the configuration information includes the time-frequency domain location of the physical random access channel resource. Correspondingly, in a manner in which the second node sends the preamble to the first node at the time-frequency domain location of the physical random access channel resource, signaling overheads can be reduced.

A tenth aspect of embodiments of this application discloses a communication method, including:

A first node sends, to a second node, physical random access channel configuration information dedicated to the second node, where the physical random access channel configuration information includes a time-frequency domain location of a physical random access channel resource.

The first node receives the preamble from the second node at the time-frequency domain location of the physical random access channel resource.

An eleventh aspect of embodiments of this application discloses a communication apparatus, where the apparatus includes at least one processor and a communication interface, and the at least one processor invokes a computer program or instructions stored in a memory to perform any one of the implementations of the first aspect to the tenth aspect.

A twelfth aspect of embodiments of this application discloses a communication apparatus, including a processing unit and a communication unit.

The processing unit is configured to generate node configuration information.

The communication unit is configured to send the node configuration information to a second node, where the node configuration information is used for conversion of a first beam set of the apparatus into a second beam set of the second node, and the first beam set and the second beam set each include at least one beam.

The communication unit is configured to send the first beam set.

In a possible implementation, a beam multiplexing mode in the first beam set includes time division multiplexing or frequency division multiplexing, and a beam multiplexing mode in the second beam set includes spatial division multiplexing.

In another possible implementation, the node configuration information includes at least one of the following: forwarding configuration information, power control information, control information occasion information, N sets of beamforming parameter information supported by the second node, and frequency band amplification and suppression information of the second node, where N is greater than or equal to 1, the control information occasion information indicates a time-frequency resource location at which the apparatus sends control information to the second node, the beamforming parameter information includes one or more of a phase offset, an amplitude, and an index, and the index indicates the phase offset and/or an amplitude parameter.

In another possible implementation, the forwarding configuration information includes at least one of the following: forwarding start time information, first duration information, first indication information, time forwarding pattern information of the second node, and direction forwarding pattern information of the second node.

The first duration information indicates use duration of a first beamforming parameter, the use duration of the first beamforming parameter is equal to sending duration of a first beam in the second beam set, the first indication information indicates a quantity of beams in the second beam set, the time forwarding pattern information of the second node indicates a time location of a forwarded beam in the second beam set, and the direction forwarding pattern information of the second node indicates a beamforming parameter used for forwarding each beam in the second beam set.

In another possible implementation, the quantity of the beams in the second beam set is equal to a quantity of sets of beamforming parameters used by the second node, and the quantity of sets of the beamforming parameters used by the second node is less than or equal to N.

In another possible implementation, the forwarding start time information includes identifier information of a first beam in the first beam set, or a first interval and start orthogonal frequency division multiplexing symbol information.

The identifier information of the first beam indicates that forwarding starts from time corresponding to the first beam, the first interval indicates a quantity of slots between a slot in which the node configuration information is received and a forwarding start slot, and the start orthogonal frequency division multiplexing symbol information indicates a forwarding start orthogonal frequency division multiplexing symbol in the forwarding start slot.

In another possible implementation, the first indication information includes at least one of the following: a subcarrier spacing, a frequency band, cell identifier information, and K, where K is greater than or equal to 1.

In another possible implementation, the node configuration information is carried in radio resource control layer signaling, downlink control information of a physical downlink control channel, or a media access control control element.

In another possible implementation, the processing unit is further configured to generate system information, where the system information includes index information of the at least one beam in the first beam set. The communication unit is further configured to send the system information.

In another possible implementation, the communication unit is further configured to send system information change indication information to the second node.

In another possible implementation, the communication unit is further configured to continuously send beams in the first beam set in time.

In another possible implementation, the processing unit is further configured to: determine, based on forwarding capability information of the second node, that a quantity of sets of beamforming parameters supported by the second node is N, or determine, in different subcarrier spacings and/or different frequency bands, quantities of sets of beamforming parameters supported by the second node.

In another possible implementation, the quantity of sets of the beamforming parameters supported by the second node is greater than or equal to the quantity of the beams in the second beam set or the quantity of sets of the beamforming parameters used by the second node.

In another possible implementation, the communication unit is further configured to receive a first message from a second node, where the first message is for requesting to establish a radio resource control connection, the first message includes second indication information, and the second indication information indicates that a terminal that initiates the request is the second node. The communication unit is further configured to send a second message to the second node.

In another possible implementation, the first message includes third indication information, and the third indication information indicates identifier information of the second node.

In another possible implementation, the first message includes third indication information, and the third indication information indicates capability information of the second node.

In another possible implementation, the third indication information includes an information field, and a structure corresponding to the information field is used to define the capability information of the second node.

In another possible implementation, the third indication information includes a bit sequence, and the bit sequence indicates the capability information of the second node.

In another possible implementation, the third indication information includes an index value, and the index value indicates the capability information of the second node.

In another possible implementation, the second message includes a first value, and the first value is used to verify identity information of the second node.

In another possible implementation, the communication unit is further configured to receive a third message from the second node, where the third message includes a first response number. The processing unit is further configured to obtain a public key of the second node, where the public key is preconfigured by a network management function network element or is requested by the apparatus from a network management function network element. The processing unit is further configured to verify the first response number based on the first value and the public key, to determine the identity information of the second node.

In another possible implementation, the third message includes capability information of the second node.

In another possible implementation, the communication unit is further configured to send a capability inquiry message to the second node. The communication unit is further configured to receive the capability information of the second node from the second node.

In another possible implementation, the communication unit is further configured to receive capability information from a second node, where the capability information includes forwarding capability information of the second node.

In another possible implementation, the capability information further includes one or more of the following: a specification of the second node, frequency band amplification and suppression information of the second node, and maximum uplink and downlink transmit power of the second node.

In another possible implementation, the forwarding capability information of the second node includes one or more of the following: a maximum quantity of beams capable of being forwarded by the second node, quantities of beams forwarded by the second node in different subcarrier spacings and/or different frequency bands, and the different subcarrier spacings and/or the different frequency bands supported by the second node.

In another possible implementation, the communication unit is further configured to send, to a second node, physical random access channel configuration information dedicated to the second node, where the physical random access channel configuration information includes a first preamble. The communication unit is further configured to receive the first preamble from the second node.

In another possible implementation, the physical random access channel configuration information further includes a time-frequency domain location of a physical random access channel resource, and the communication unit is further configured to receive the preamble from the second node at the time-frequency domain location of the physical random access channel resource.

In another possible implementation, the communication unit is further configured to send, to a second node, physical random access channel configuration information dedicated to the second node, where the physical random access channel configuration information includes a time-frequency domain location of a physical random access channel resource. The communication unit is further configured to receive a preamble from the second node at the time-frequency domain location of the physical random access channel resource.

For technical effects achieved by the twelfth aspect or the possible implementations, refer to the descriptions of the technical effects achieved by the first aspect or the corresponding implementations.

A thirteenth aspect of embodiments of this application discloses a communication apparatus, including a processing unit and a communication unit.

The communication unit is configured to receive node configuration information and a first beam set of a first node from the first node.

The processing unit is configured to convert the first beam set into a second beam set of the apparatus based on the node configuration information, where the first beam set and the second beam set each include at least one beam.

The communication unit is configured to send the second beam set.

In a possible implementation, the processing unit is configured to determine, based on the node configuration, to forward the first beam set to form the second beam set of the apparatus.

In another possible implementation, a beam multiplexing mode in the first beam set includes time division multiplexing or frequency division multiplexing, and a beam multiplexing mode in the second beam set includes spatial division multiplexing.

In another possible implementation, the node configuration information includes at least one of the following: forwarding configuration information, power control information, control information occasion information, N sets of beamforming parameter information supported by the apparatus, and frequency band amplification and suppression information of a second node, where N is greater than or equal to 1, the control information occasion information indicates a time-frequency resource location at which the apparatus receives control information from the first node, the beamforming parameter includes one or more of a phase offset, an amplitude, and an index, and the index indicates the phase offset and/or an amplitude parameter.

In another possible implementation, the forwarding configuration information includes at least one of the following: forwarding start time information, first duration information, first indication information, time forwarding pattern information of the apparatus, and direction forwarding pattern information of the apparatus. The first duration information indicates sending duration for which the apparatus sends a first beam in the second beam set by using a first beamforming parameter, the first indication information indicates a quantity of beams in the second beam set, and the time forwarding pattern information of the apparatus indicates time locations at which the apparatus forwards the second beam set from forwarding start time; and the direction forwarding pattern information of the apparatus indicates beamforming parameters used by the apparatus to forward the second beam set.

In another possible implementation, the quantity of the beams in the second beam set is equal to a quantity of sets of the beamforming parameters used by the apparatus, and the quantity of sets of the beamforming parameters used by the apparatus is less than or equal to N.

In another possible implementation, the forwarding start time information includes identifier information of a first beam in the first beam set, or a first interval and start orthogonal frequency division multiplexing symbol information. The identifier information of the first beam indicates that the apparatus starts to forward the second beam set from time corresponding to the first beam, the first interval indicates a quantity of slots between a slot in which the apparatus receives the node configuration information and a forwarding start slot, and the start orthogonal frequency division multiplexing symbol information indicates a forwarding start orthogonal frequency division multiplexing symbol in the forwarding start slot.

In another possible implementation, the first indication information includes at least one of the following: a subcarrier spacing, a frequency band, cell identifier information, and K, where K is greater than or equal to 1.

In another possible implementation, the time forwarding pattern information of the apparatus includes a first bitmap, and a bit in the first bitmap corresponds to a unit interval. When a value of a bit in the first bitmap is a first preset value, the communication unit is configured to forward a beam in the second beam set at a unit interval corresponding to the bit.

In another possible implementation, the direction forwarding pattern information of the apparatus includes a second bitmap, and a bit in the second bitmap corresponds to a set of beamforming parameters. When a value of a bit in the second bitmap is a second preset value, the communication unit is configured to forward a beam in the second beam set by using a set of BF parameters corresponding to the bit.

In another possible implementation, the control information occasion information includes at least one of the following: a time periodicity, a frequency domain resource block, a quantity of occupied orthogonal frequency division multiplexing symbols, and a time start location.

In another possible implementation, the node configuration information is carried in radio resource control layer signaling, downlink control information of a physical downlink control channel, or a media access control control element.

In another possible implementation, the communication unit is further configured to receive system information from the first node, where the system information includes index information of the at least one beam in the first beam set.

In another possible implementation, the communication unit is further configured to receive system information change indication information from the first node.

In another possible implementation, the communication unit is further configured to continuously receive beams in the first beam set in time.

In another possible implementation, a control plane protocol stack of the apparatus includes a radio resource control layer, a media access control layer, and a physical layer.

In another possible implementation, the communication unit is further configured to send a first message to a first node, where the first message is for requesting to establish a radio resource control connection, the first message includes second indication information, and the second indication information indicates that a terminal that initiates the request for establishing the radio resource control connection is the apparatus. The communication unit is further configured to receive a second message from the first node. The processing unit is further configured to establish the radio resource control connection to the first node based on the second message.

In another possible implementation, the first message includes third indication information, and the third indication information indicates identifier information of the apparatus.

In another possible implementation, the first message includes third indication information, and the third indication information indicates capability information of the apparatus.

In another possible implementation, the third indication information includes an information field, and a structure corresponding to the information field is used to define the capability information of the apparatus.

In another possible implementation, the third indication information includes a bit sequence, and the bit sequence indicates the capability information of the apparatus.

In another possible implementation, the third indication information includes an index value, and the index value indicates the capability information of the apparatus.

In another possible implementation, the second message includes a first value, and the processing unit is further configured to generate a first response number based on the first value and a private key in a digital certificate. The communication unit is further configured to send a third message to the first node, where the third message includes the first response number, and the first response number is used by the first node to verify identity information of the apparatus.

In another possible implementation, the third message includes capability information of the apparatus.

In another possible implementation, the communication unit is further configured to receive a capability inquiry message from the first node. The apparatus sends the capability information of the apparatus to the first node.

In another possible implementation, the communication unit is further configured to send capability information of the apparatus to the first node, where the capability information includes forwarding capability information of the apparatus.

In another possible implementation, the capability information further includes one or more of the following: a specification of the apparatus, frequency band amplification and suppression information of the apparatus, and maximum uplink and downlink transmit power of the apparatus.

In another possible implementation, the forwarding capability information of the apparatus includes one or more of the following: a maximum quantity of beams capable of being forwarded by the apparatus, quantities of beams forwarded by the apparatus in different subcarrier spacings and/or different frequency bands, and the different subcarrier spacings and/or the different frequency bands supported by the apparatus.

In another possible implementation, the communication unit is further configured to, from a first node, receive physical random access channel configuration information dedicated to the apparatus, where the physical random access channel configuration information includes a first preamble. The communication unit is further configured to send the first preamble to the first node.

In another possible implementation, the physical random access channel configuration information further includes a time-frequency domain location of a physical random access channel resource. The communication unit is configured to send the preamble to the first node at the time-frequency domain location of the physical random access channel resource.

In another possible implementation, the communication unit is further configured to receive, from a first node, physical random access channel configuration information dedicated to the apparatus, where the physical random access channel configuration information includes a time-frequency domain location of a physical random access channel resource. The communication unit is further configured to send a preamble to the first node at the time-frequency domain location of the physical random access channel resource.

For technical effects achieved by the thirteenth aspect or the possible implementations, refer to the descriptions of the technical effects achieved by the second aspect or the corresponding implementations.

A fourteenth aspect of embodiments of this application discloses a communication apparatus, including a processing unit and a communication unit.

The communication unit is configured to send a first message to a first node, where the first message is for requesting to establish a radio resource control connection, the first message includes first indication information, and the first indication information indicates that a terminal that initiates the request for establishing the radio resource control connection is the apparatus.

The communication unit is configured to receive a second message from the first node.

The processing unit is configured to establish the radio resource control connection to the first node based on the second message.

In a possible implementation, the first message includes second indication information, and the second indication information indicates identifier information of the apparatus.

In another possible implementation, the first message includes second indication information, and the second indication information indicates capability information of the apparatus.

In another possible implementation, the second indication information includes an information field, and a structure corresponding to the information field is used to define the capability information of the apparatus.

In another possible implementation, the second indication information includes a bit sequence, and the bit sequence indicates the capability information of the apparatus.

In another possible implementation, the second indication information includes an index value, and the index value indicates the capability information of the apparatus.

In another possible implementation, the second message includes a first value, and the processing unit is further configured to generate a first response number based on the first value and a private key in a digital certificate. The communication unit is further configured to send a third message to the first node, where the third message includes the first response number, and the first response number is used by the first node to verify identity information of the apparatus.

In another possible implementation, the third message includes capability information of the apparatus.

In another possible implementation, the communication unit is further configured to receive a capability inquiry message from the first node. The communication unit is further configured to send the capability information of the apparatus to the first node.

In another possible implementation, a control plane protocol stack of the apparatus includes a radio resource control layer, a media access control layer, and a physical layer.

For technical effects achieved by the fourteenth aspect or the possible implementations, refer to the descriptions of the technical effects achieved by the third aspect or the corresponding implementations.

A fifteenth aspect of embodiments of this application discloses a communication apparatus, including a processing unit and a communication unit.

The communication unit is configured to receive a first message from a second node, where the first message is for requesting to establish a radio resource control connection, the first message includes first indication information, and the first indication information indicates that a terminal that initiates the request is the second node.

The communication unit is configured to send a second message to the second node.

In a possible implementation, the first message includes second indication information, and the second indication information indicates identifier information of the second node.

In another possible implementation, the first message includes second indication information, and the second indication information indicates capability information of the second node.

In another possible implementation, the second indication information includes an information field, and a structure corresponding to the information field is used to define the capability information of the second node.

In another possible implementation, the second indication information includes a bit sequence, and the bit sequence indicates the capability information of the second node.

In another possible implementation, the second indication information includes an index value, and the index value indicates the capability information of the second node.

In another possible implementation, the second message includes a first value, and the first value is used to verify identity information of the second node.

In another possible implementation, the communication unit is further configured to receive a third message from the second node, where the third message includes a first response number. The processing unit is further configured to obtain a public key of the second node, where the public key is preconfigured by a network management function network element or is requested from a network management function network element. The processing unit is configured to verify the first response number based on the first value and the public key, to determine the identity information of the second node.

In another possible implementation, the third message includes capability information of the second node.

In another possible implementation, the communication unit is further configured to send a capability inquiry message to the second node. The communication unit is further configured to receive the capability information of the second node from the second node.

For technical effects achieved by the fifteenth aspect or the possible implementations, refer to the descriptions of the technical effects achieved by the fourth aspect or the corresponding implementations.

A sixteenth aspect of embodiments of this application discloses a communication apparatus, including a processing unit and a communication unit.

The communication unit is configured to send capability information of the apparatus to a first node, where the capability information includes forwarding capability information of the apparatus.

In a possible implementation, the capability information further includes one or more of the following: a specification of the apparatus, frequency band amplification and suppression information of the apparatus, and maximum uplink and downlink transmit power of the apparatus.

In another possible implementation, the forwarding capability information of the apparatus includes one or more of the following: a maximum quantity of beams capable of being forwarded by the apparatus, quantities of beams forwarded by the apparatus in different subcarrier spacings and/or different frequency bands, and the different subcarrier spacings and/or the different frequency bands supported by the apparatus.

For technical effects achieved by the sixteenth aspect or the possible implementations, refer to the descriptions of the technical effects achieved by the fifth aspect or the corresponding implementations.

A seventeenth aspect of embodiments of this application discloses a communication apparatus, including a processing unit and a communication unit.

The communication unit is configured to receive capability information from a second node, where the capability information includes forwarding capability information of the second node.

In a possible implementation, the capability information further includes one or more of the following: a specification of the second node, frequency band amplification and suppression information of the second node, and maximum uplink and downlink transmit power of the second node.

In another possible implementation, the forwarding capability information of the second node includes one or more of the following: a maximum quantity of beams capable of being forwarded by the second node, quantities of beams forwarded by the second node in different subcarrier spacings and/or different frequency bands, and the different subcarrier spacings and/or the different frequency bands supported by the second node.

For technical effects achieved by the seventeenth aspect or the possible implementations, refer to the descriptions of the technical effects achieved by the sixth aspect or the corresponding implementations.

An eighteenth aspect of embodiments of this application discloses a communication apparatus, including a processing unit and a communication unit.

The communication unit is configured to receive, from a first node, physical random access channel configuration information dedicated to a second node, where the physical random access channel configuration information includes a first preamble.

The communication unit is configured to send the first preamble to the first node.

In a possible implementation, the physical random access channel configuration information further includes a time-frequency domain location of a physical random access channel resource. The communication unit is configured to send the preamble to the first node at the time-frequency domain location of the physical random access channel resource.

For technical effects achieved by the eighteenth aspect or the possible implementations, refer to the descriptions of the technical effects achieved by the seventh aspect or the corresponding implementations.

A nineteenth aspect of embodiments of this application discloses a communication apparatus, including a processing unit and a communication unit.

The communication unit is configured to send, to a second node, physical random access channel configuration information dedicated to the second node, where the physical random access channel configuration information includes a first preamble.

The communication unit is configured to receive the first preamble from the second node.

In a possible implementation, the physical random access channel configuration information further includes a time-frequency domain location of a physical random access channel resource, and the communication unit is configured to receive the preamble from the second node at the time-frequency domain location of the physical random access channel resource.

For technical effects achieved by the nineteenth aspect or the possible implementations, refer to the descriptions of the technical effects achieved by the eighth aspect or the corresponding implementations.

A twentieth aspect of embodiments of this application discloses a communication apparatus, including a processing unit and a communication unit.

The communication unit is configured to receive, from a first node, physical random access channel configuration information dedicated to a second node, where the physical random access channel configuration information includes a time-frequency domain location of a physical random access channel resource.

The communication unit is configured to send the preamble to the first node at the time-frequency domain location of the physical random access channel resource.

For technical effects achieved by the twentieth aspect or the possible implementations, refer to the descriptions of the technical effects achieved by the ninth aspect or the corresponding implementations.

A twenty-first aspect of embodiments of this application discloses a communication apparatus, including a processing unit and a communication unit.

The communication unit is configured to send, to a second node, physical random access channel configuration information dedicated to the second node, where the physical random access channel configuration information includes a time-frequency domain location of a physical random access channel resource.

The communication unit is configured to receive a preamble from the second node at the time-frequency domain location of the physical random access channel resource.

For technical effects achieved by the twenty-first aspect or the possible implementations, refer to the descriptions of the technical effects achieved by the tenth aspect or the corresponding implementations.

A twenty-second aspect of embodiments of this application discloses a chip system, where the chip system includes at least one processor and a communication interface, and the at least one processor is configured to execute a computer program or instructions, to implement the method according to any one of the foregoing aspects.

A twenty-third aspect of embodiments of this application discloses a computer-readable storage medium, where the computer-readable storage medium stores computer instructions, and when the computer instructions are run on a processor, the method according to any one of the foregoing aspects is implemented.

A twenty-fourth aspect of embodiments of this application discloses a computer program product, where the computer program product includes computer program code, and when the computer program code is run on a computer, the method according to any one of the foregoing aspects is implemented.

A twenty-fifth aspect of embodiments of this application discloses a communication system, where the system includes:

the apparatus according to the twelfth aspect and the apparatus according to the thirteenth aspect;

the apparatus according to the fourteenth aspect and the apparatus according to the fifteenth aspect;

the apparatus according to the sixteenth aspect and the apparatus according to the seventeenth aspect;

the apparatus according to the eighteenth aspect and the apparatus according to the nineteenth aspect; and/or the apparatus according to the twentieth aspect and the apparatus according to the twenty-first aspect.

BRIEF DESCRIPTION OF DRAWINGS

The following describes the accompanying drawings used in embodiments of this application.

DESCRIPTION OF EMBODIMENTS

The following describes embodiments of this application with reference to the accompanying drawings in embodiments of this application.

Figure 1:
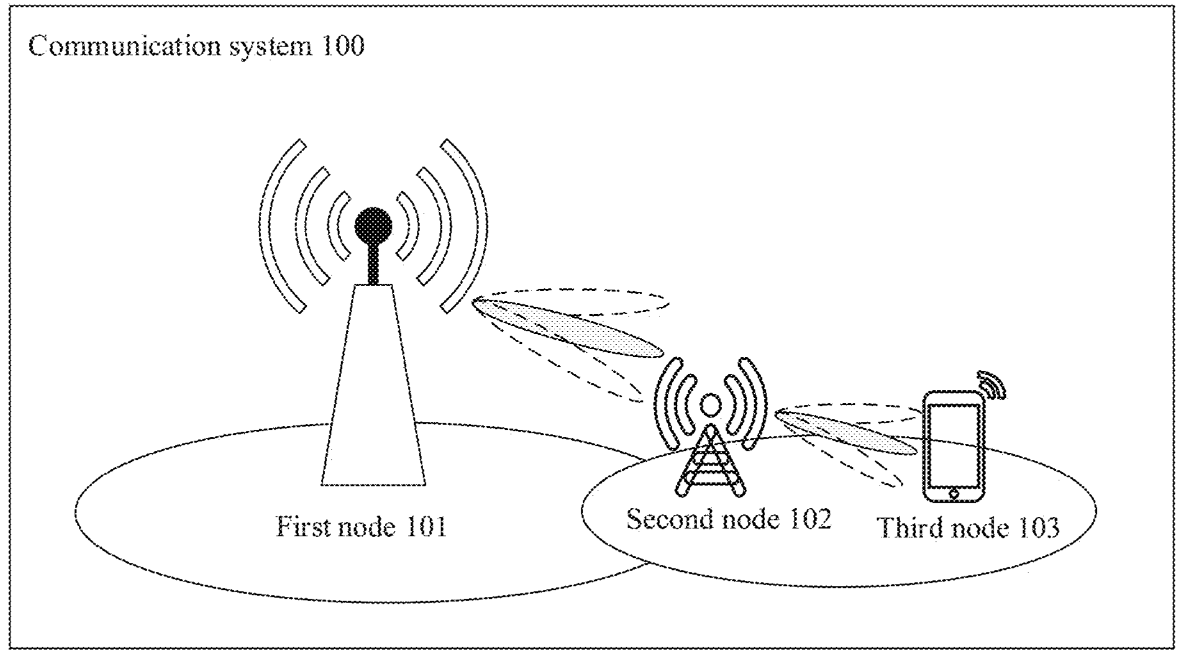
FIG. 1 is a diagram of a structure of a communication system according to an embodiment of this application.

FIG. 1 is a diagram of a structure of a communication system 100 according to an embodiment of this application. The communication system 100 includes a first node 101, a second node 102, and a third node 103. The first node 101 may be a network device, and the second node 102 may be a smart repeater (SR), where the SR may also be referred to as a network-controlled repeater or a smart forwarder. Under control of the first node 101, the second node 102 amplifies and forwards, to the first node 101 in a time division duplex (TDD) or frequency division duplex (FDD) manner, an uplink signal sent by the third node 103; or may amplify and forward, to the third node 103, a downlink signal sent by the first node 101, and implements beamforming (BF) transmission for the third node 103 when forwarding the downlink signal to the third node 103.

Figure 2:
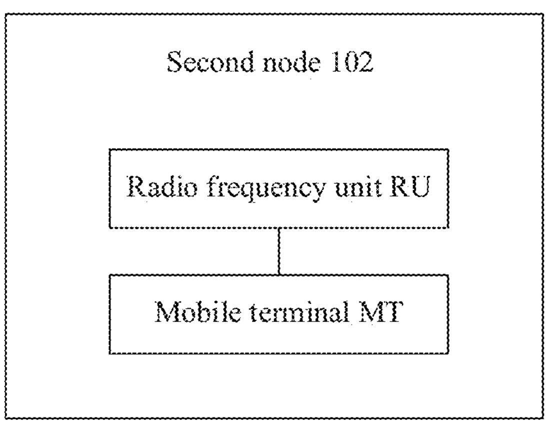
FIG. 2 is a diagram of a structure of a second node according to an embodiment of this application.
Figure 3:
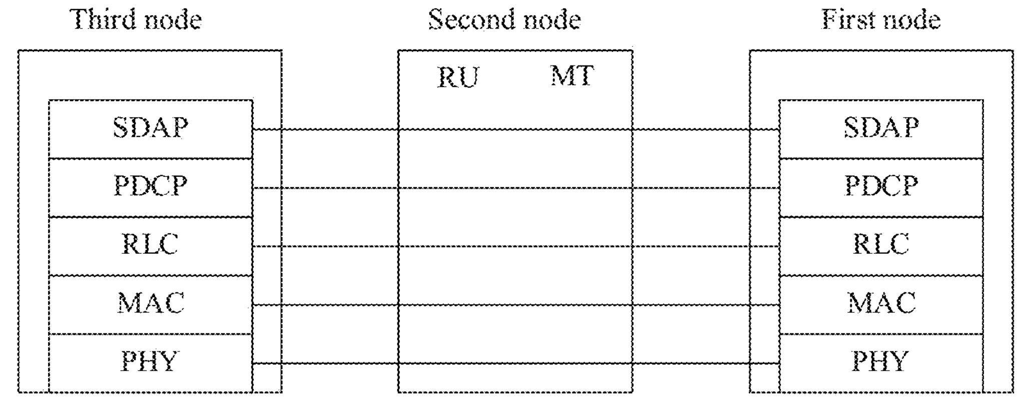
FIG. 3 is a diagram of user plane and control plane protocol stacks of a second node according to an embodiment of this application.
Figure 3:
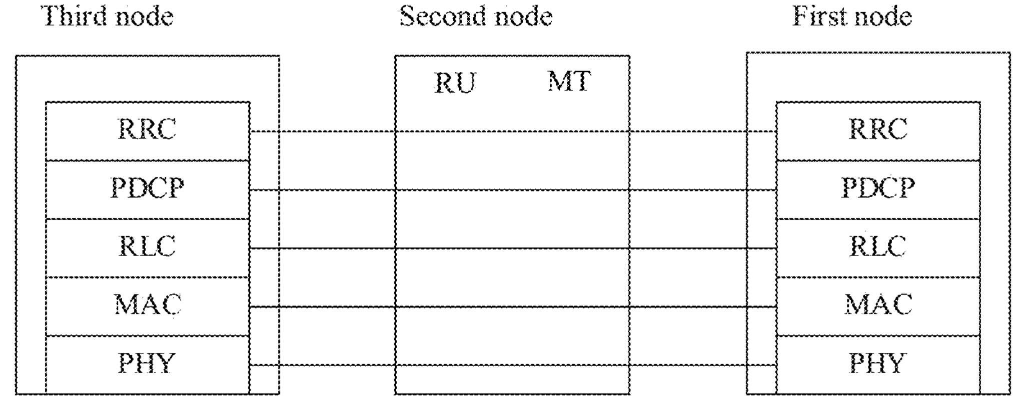
Figure 4:
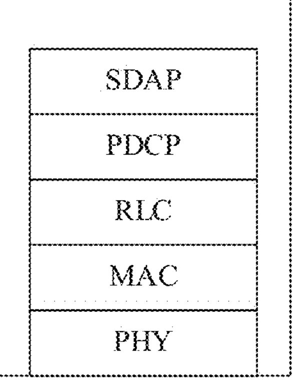
FIG. 4 is a diagram of user plane and control plane protocol stacks of a second node according to an embodiment of this application.
Figure 5:
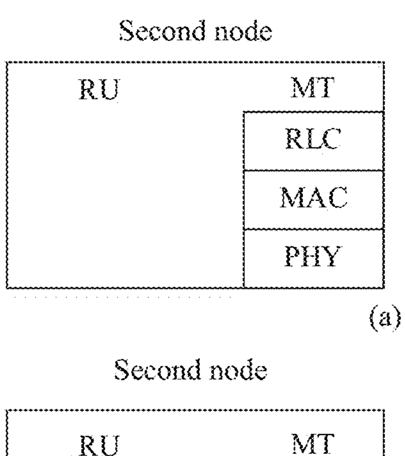
FIG. 5 is a diagram of a control plane protocol stack of a second node according to an embodiment of this application.
Figure 5:
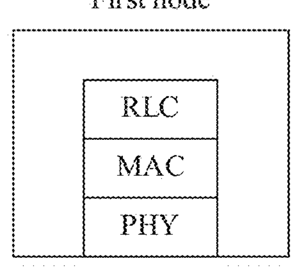
Figure 5:
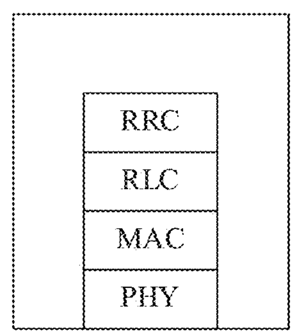
Figure 5:
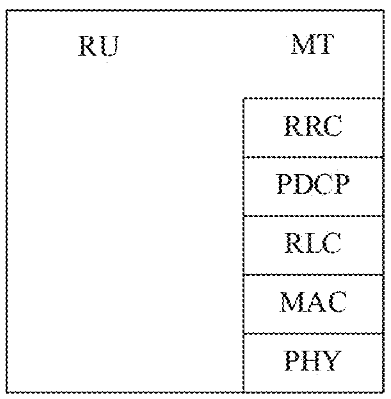
Figure 5:
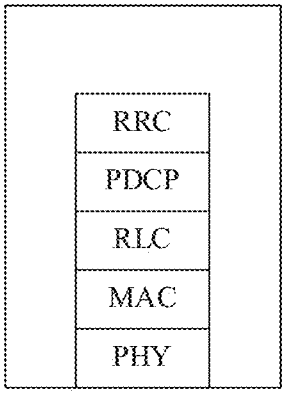

FIG. 2 is a diagram of a structure of a second node 102. The second node 102 may include a radio frequency unit (radio unit, RU) module and a mobile terminal (MT) module. When the second node is an SR, the RU module in the second node may be briefly referred to as an SR-RU, and the MT module in the second node may be briefly referred to as an SR-MT. The MT module in the second node is configured to: receive and feed back control signaling of the first node 101. A communication link between the second node 102 and the first node 101 may be referred to as a backhaul link. The backhaul link may be used to: receive a signal sent by the first node 101 or forward a signal sent by the third node 103. A communication link between the second node 102 and the third node 103 may be referred to as an access link (access link). The access link may be used to: receive a signal sent by the third node 103 or forward a signal sent by the first node 101. Protocol layer design of the second node 102 is as follows. When the second node 102 transmits service data between the third node 103 and the first node 101, that is, when the second node 102 is used as a forwarding node, as shown in FIG. 3, user plane (UP) and control plane (CP) protocol stacks of the RU module and the MT module in the second node 102 are both empty. When the second node 102 transmits service data between the second node 102 and the network device, because the MT module in the second node does not generate user plane data, and exchanges control plane signaling only with the first node 101, the MT module in the second node needs to complete the exchange, and the RU module in the second node is not used. Consequently, as shown in FIG. 4, the UP protocol stacks of the RU module in the second node and the MT module in the second node are empty. As shown in FIG. 5, the CP protocol stack of the MT module in the second node may be designed in three cases based on function requirements, and details are provided as follows.

(1) As shown in (a) in FIG. 5, the CP protocol stack of the MT module in the second node includes three layers: a radio resource control (RRC) layer, a media access control (MAC) layer, and a physical (PHY).

(2) As shown in (b) in FIG. 5, the CP protocol stack of the MT module in the second node includes four layers: an RRC layer, a radio link control (RLC) layer, a MAC layer, and a PHY layer.

(3) As shown in (c) in FIG. 5, the CP protocol stack of the MT module in the second node includes five layers: an RRC layer, a packet data convergence protocol (PDCP) layer, an RLC layer, a MAC layer, and a PHY layer.

The RRC layer may implement RRC signaling exchange between the second node 102 and the first node 101, to complete processes such as initial access, RRC connection establishment, SR identity information verification, SR capability information reporting, and initial configuration. A hybrid automatic repeat request (ARQ) protocol at the RLC layer and an ARQ protocol at the MAC layer can ensure high transmission reliability of control plane information. The PDCP layer may complete encryption and integrity protection on control plane data to ensure information transmission security. A method in embodiments of this application can be applied to the communication system 100 shown in FIG. 1.

(1) A terminal device includes user equipment (UE), and includes a device providing voice and/or data connectivity for a user. Specifically, the terminal device includes a device providing voice for the user, a device providing data connectivity for the user, or a device providing voice and data connectivity for the user. For example, a handheld device with a wireless connection function or a processing device connected to a wireless modem may be included. The terminal device may communicate with a core network through a radio access network (RAN), and exchange voice or data with the RAN, or exchange voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine-type communications (M2M/MTC) terminal device, an internet of things (IOT) terminal device, a light terminal device (light UE), reduced capability user equipment (reduced capability UE, REDCAP UE), a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, handheld, or computer built-in mobile apparatus. For example, the terminal device may be a device, such as a personal communications service (PCS) phone, a cordless telephone, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, a radio frequency identification (RFID) device, a sensor, a global positioning system (GPS), or a laser scanner.

By way of example rather than limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as in-vehicle terminal devices. For example, the in-vehicle terminal devices are also referred to as on-board units (OBUs).

In embodiments of this application, the terminal device may further include a relay (relay). Alternatively, it is understood as that any device that can perform data communication with a base station may be considered as a terminal device.

In embodiments of this application, an apparatus configured to implement a function of the terminal device may be a terminal device, or may be an apparatus, for example, a chip system, that can support the terminal device in implementing this function. The apparatus may be installed in the terminal device. In embodiments of this application, the chip system may include a chip, or may include a chip and another discrete device. In the technical solutions provided in embodiments of this application, an example in which the apparatus configured to implement this function of the terminal is the terminal device is used to describe the technical solutions provided in embodiments of this application.

(2) The network device includes, for example, an access network (AN) device such as a base station (for example, an access point), and may be a device that communicates with a wireless terminal device over an air interface through one or more cells in an access network. Alternatively, for example, the network device in a vehicle-to-everything (V2X) technology is a road side unit (RSU). The base station may be configured to mutually convert a received over-the-air frame and an IP packet, and serve as a router between the terminal device and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (eNB, or e-NodeB, evolved NodeB) in a long term evolution (LTE) system or a long term evolution-advanced (LTE-A) system, may include a next generation NodeB (gNB) in a 5th generation (5G) mobile communication technology NR system (also briefly referred to as an NR system), or may include a central unit (CU) and a distributed unit (DU) in a cloud radio access network (Cloud RAN) system. This is not limited in embodiments of this application.

The network device may further include a core network device. The core network device includes, for example, an access and mobility management function (AMF), a user plane function (UPF), or a session management function (SMF).

In embodiments of this application, an apparatus configured to implement a function of the network device may be a network device, or may be an apparatus, for example, a chip system, that can support the network device in implementing this function. The apparatus may be installed in the network device. In the technical solutions provided in embodiments of this application, an example in which the apparatus configured to implement this function of the network device is the network device is used to describe the technical solutions provided in embodiments of this application.

Current research on the SR still lacks corresponding protocol standards in many aspects, for example, design of a protocol stack, initial access, and authentication design of the SR, updates of system information (SI) after introduction of the SR, ways of how the network device sends control information to the SR, and configurations included in the control information. Therefore, to resolve the foregoing problems, embodiments of this application provide the following solutions.

Figure 6:
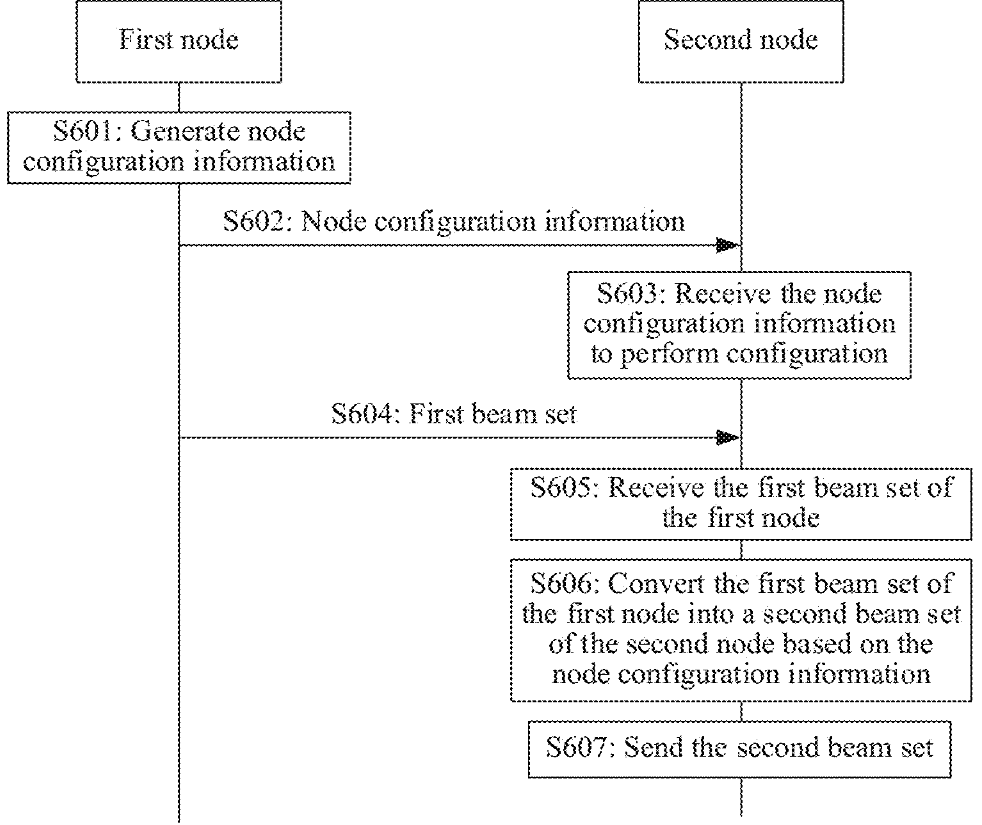
FIG. 6 is a schematic flowchart of a communication method according to an embodiment of this application.

Refer to FIG. 6. FIG. 6 shows a communication method according to an embodiment of this application. The method includes but is not limited to the following steps.

Step S601: A first node generates node configuration information.

Step S602: The first node sends the node configuration information to a second node.

The node configuration information is used for conversion of a first beam set of the first node into a second beam set of the second node. The first beam set and the second beam set each include at least one beam, and beams in the first beam set and the second beam set may be synchronization signal blocks (SSBs), channel state information reference signals (CSI-RSs), or beams corresponding to downlink service data transmission. This is not limited herein.

Specifically, the node configuration information includes at least one of the following: forwarding configuration information, power control information, control information occasion information, N sets of BF parameter information supported by the second node, and frequency band amplification and suppression information of the second node. The frequency band amplification and suppression information of the second node is frequency band amplification and suppression information of an RU module in the second node. The forwarding configuration information, the power control information, and the control information occasion information are mandatory, and the N sets of BF parameter information supported by the second node and the frequency band amplification and suppression information of the second node are optional. The node configuration information may be carried in RRC layer signaling, downlink control information (DCI) of a physical downlink control channel (PDCCH), or a MAC control element (CE). When the node configuration information is carried in the CE of the MAC layer, the first node sends the node configuration information to the second node by using a protocol data unit (PDU) of the MAC layer. Specifically, the node configuration information may be carried in the RRC signaling, for example, an RRC reconfiguration (RRCReconfiguration) message. The node configuration information includes one or more of the following: the forwarding configuration information, the power control information, the control information occasion information, the N sets of BF parameter information supported by the second node, and the frequency band amplification and suppression information of the second node, which may be carried in extension information elements included in the RRCReconfiguration message, for example, a future critical extension (criticalExtensionsFuture) information element, and a late non-critical extension (lateNonCriticalExtension) information element and a non-critical extension (nonCriticalExtension) information element in an RRC reconfiguration IE (RRCReconfiguration-IEs) information element. In specific implementation, whether to use examples of the extension information elements included in the RRCReconfiguration message and which extension information element is specifically used are not limited in this embodiment of this application.

The forwarding configuration information includes at least one of the following: forwarding start time information, first duration information, first indication information, time forwarding pattern (SR-time-forwarding-pattern) information of the second node, and direction forwarding pattern (SR-direction-forwarding-pattern) information of the second node. The forwarding configuration information indicates a period of time, a direction, and a BF parameter, for the second node to forward the second beam set. The forwarding start time information is mandatory. The first duration information, the first indication information, the time forwarding pattern information of the second node, and the direction forwarding pattern information of the second node are optional.

The forwarding start time information may be understood as forwarding start time at which the second node forwards the second beam set. The forwarding start time information includes identifier information of a first beam in the first beam set, or a first interval and start OFDM symbol information. The identifier information of the first beam indicates that forwarding starts from time corresponding to the first beam, the first interval indicates a quantity of slots between a slot in which the node configuration information is received and a forwarding start slot, and the start OFDM symbol information indicates a forwarding start OFDM symbol in the forwarding start slot. The identifier information of the first beam in the first beam set may be identifier information of a backhaul synchronization signal block (backhaul synchronization signal and physical broadcast channel block, BH-SSB) and identifier information of a channel state information reference signal (CSI-RS). The identifier information of the BH-SSB may be an index of the BH-SSB. The BH-SSB is an SSB that is determined by the first node in an initial access process of the second node and that works best with the second node, for example, an SSB that has a best signal and that is received by the second node, or may be understood as an SSB that is aligned with a direction of the second node. When the forwarding start time information includes the first interval and the start OFDM symbol information, the node configuration information is carried in the DCI of the PDCCH. Specifically, a time domain resource assignment (Time domain resource assignment) field in the DCI may indicate the second node to start to forward the second beam set at a forwarding start OFDM symbol location indicated by the start OFDM symbol information and after a first slot after a start moment at which the node configuration information is received by using the DCI. The forwarding start time information may further include forwarding duration information, and the forwarding duration information indicates duration for which the second node forwards the second beam set. The node configuration information indicated by the DCI may be one-time, that is, used only once, and an original configuration is then restored. Alternatively, the node configuration information may be permanent, that is, an original configuration is overwritten.

The first duration information indicates use duration of a first BF parameter, or may be understood as use duration of each set of BF parameters, where the use duration of the first BF parameter is equal to sending duration of a first beam in the second beam set. Alternatively, it may be understood as that the first duration information indicates sending duration of a first beam that is in the second beam set and that is forwarded by the second node by using a first BF parameter. The first BF parameter is used to generate the first beam in the second beam set. When the forwarding start time information does not include the first duration information, the second node may determine the use duration of the first BF parameter based on preset duration, in other words, determine the sending duration of the first beam in the second beam set based on the preset duration.

The first indication information indicates a quantity of beams in the second beam set, where the quantity of the beams in the second beam set is equal to a quantity of sets of BF parameters used by the second node, and the quantity of sets of the BF parameters used by the second node is less than or equal to a quantity of sets of BF parameters supported by the second node. The first indication information may include at least one of the following: a subcarrier spacing, a frequency band, cell identifier information, and K, where K is greater than or equal to 1 and less than or equal to N. When the first indication information is K, it may be understood as that the first node explicitly indicates that the quantity of sets of BF parameters is K, that is, the second node forwards K beams in the second beam set by using the K sets of BF parameters. When the first indication information includes the subcarrier spacing and/or the frequency band, the second node may determine, based on the subcarrier spacing and/or the frequency band and a quantity of sets of BF parameters supported in the subcarrier spacing and/or the frequency band, that the quantity of the beams in the second beam set is K. The quantity of sets of the BF parameters supported in the subcarrier spacing and/or the frequency band may be predefined in a protocol. When the first indication information includes the cell identifier information, the second node may determine, based on the cell identifier information, a subcarrier spacing and/or a frequency band corresponding to this cell, and then determine, based on a quantity of sets of BF parameters supported in the subcarrier spacing and/or the frequency band, that the quantity of the beams in the second beam set is K. The quantity of sets of the BF parameter supported in the subcarrier spacing and/or the frequency band may be predefined in a protocol. If the forwarding configuration information does not include the first indication information, the second node determines, based on a subcarrier spacing and/or a frequency band corresponding to a cell carrying the forwarding configuration information and a quantity of sets of BF parameters supported in the subcarrier spacing and/or the frequency band, that the quantity of the beams in the second beam set is K.

The time forwarding pattern information of the second node indicates a time location of a forwarded beam in the second beam set, indicates a unit interval for whether to forward a beam in the second beam set, or indicates time locations at which the second node forwards the second beam set from forwarding start time. The time forwarding pattern information of the second node may include a first bitmap (bitmap), and a bit in the first bitmap corresponds to a unit interval. When a value of a bit in the first bitmap is a first preset value, it indicates that the second node forwards a beam in the second beam set at a unit interval corresponding to the bit, where a time location of the forwarded beam in the second beam set may be a unit interval corresponding to a bit when a value of the bit in the first bitmap is the first preset value. In an example, when a value of a bit in the first bitmap is 1, it indicates that the second node forwards a beam in the second beam set at a unit interval corresponding to the bit whose value is 1, where a time location of the forwarded beam in the second beam set is the unit interval corresponding to the bit whose value is 1. In an example, when a value of a bit in the first bitmap is 0, it indicates that the second node does not forward the second beam set. If the forwarding configuration information does not include the time forwarding pattern information of the second node, the second node continuously forwards the K beams from the forwarding start time. In an example, the forwarding configuration information includes forwarding start time information, where the forwarding start time information includes the identifier information of the first beam in the first beam set, and the identifier information of the first beam in the first beam set is the index of the BH-SSB. Correspondingly, after receiving the forwarding configuration information, the second node determines, from a start moment at which each BH-SSB appears and by using duration of four orthogonal frequency division multiplexing (orthogonal frequency division multiplexing, OFDM) symbols agreed in a protocol or preset as an interval, to cyclically forward the second beam set by using the K sets of BF parameters. It is assumed that the second node supports the K sets of BF parameters on an access side, to continuously forward the K beams in the second beam set from the forwarding start time, where K is greater than or equal to 1.

The direction forwarding pattern information of the second node indicates a BF parameter used for forwarding each beam in the second beam set, that is, indicates BF parameters used by the second node to forward the second beam set. The direction forwarding pattern (SR-direction-forwarding-pattern) information of the second node includes a second bitmap, and a bit in the second bitmap corresponds to a set of BF parameters. When a value of a bit in the second bitmap is a second preset value, it indicates that the second node forwards a beam in the second beam set by using a set of BF parameters corresponding to the bit. In an example, when a value of a bit in the second bitmap is 1, it indicates that the second node may forward a beam in the second beam set by using a BF parameter corresponding to the bit whose value 1. In an example, when a value of a bit in the second bitmap is 0, it indicates that the second node does not forward the second beam set. If the forwarding configuration information does not include the direction forwarding pattern information of the second node, the second node continuously forwards the K beams in the second beam set from the forwarding start time by using the K sets of BF parameters, where K is greater than or equal to 1.

The power control information includes one or more of the following: a power gain of an SR-RU radio frequency power amplifier module, a power gain of a low noise amplifier module, and a power gain of a wireless feed line.

Figure 7:
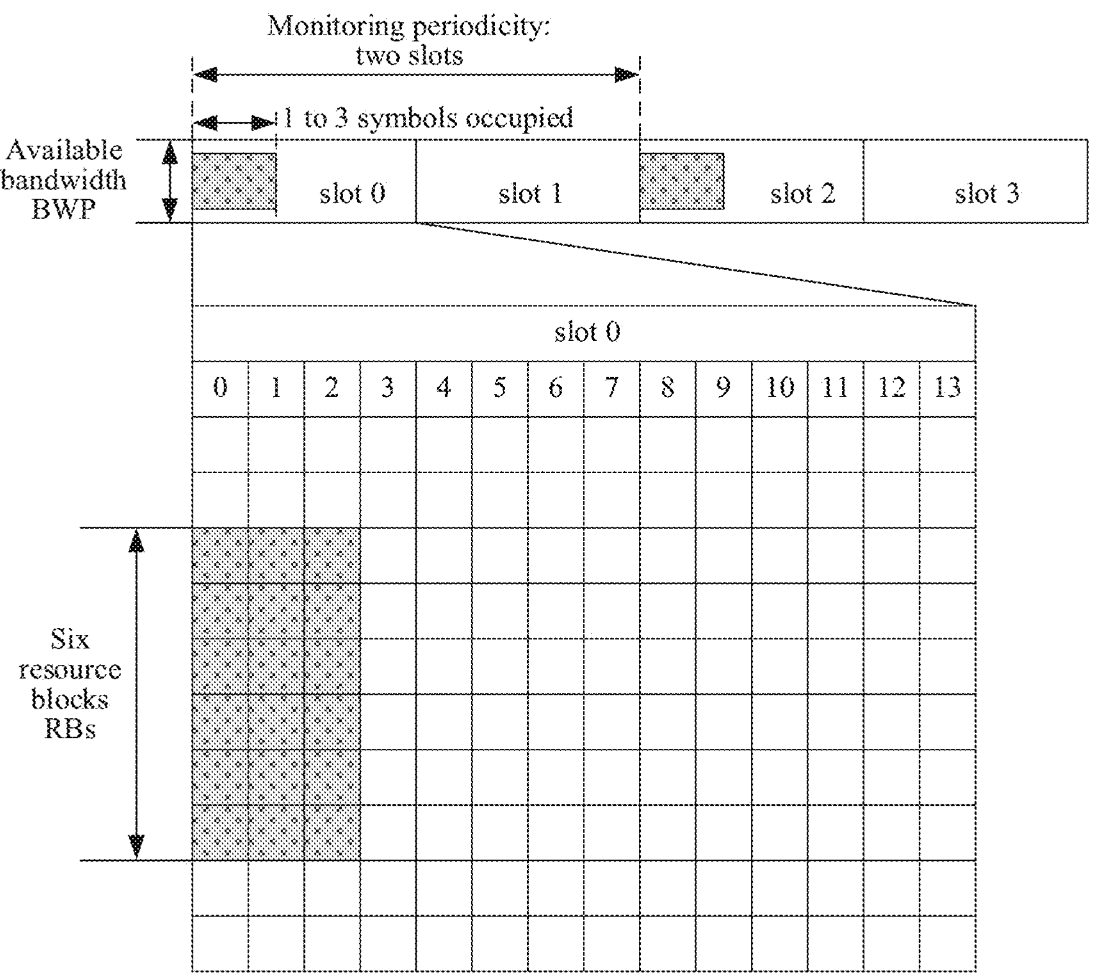
FIG. 7 is a diagram of sending control information according to an embodiment of this application.

The control information occasion information includes at least one of the following: a time periodicity, a frequency domain resource block, a quantity of occupied OFDM symbols, and a time start location. The control information occasion information indicates a time-frequency resource location at which the first node sends control information to the second node, and correspondingly, also indicates a time-frequency resource location at which the second node receives the control information from the first node. In an example, the control information occasion information includes the time periodicity, the frequency domain resource block, the quantity of occupied OFDM symbols, and the time start location. In other words, the control information occasion information includes the time periodicity for sending the control information, frequency resource blocks (RBs) to be used, the quantity of OFDM symbols to be occupied, and the time start location. The time start location may alternatively be an offset relative to a start moment at which a system frame number is 0 and a slot or a subframe is 0. In an example, as shown in FIG. 7, the first node sends control information to the second node in an available bandwidth (bandwidth part, BWP) in a periodicity of every two slots. Six RBs starting from the 3$^{rd}$ RB in each column are used in frequency domain, a total of three OFDM symbols: a symbol #0, a symbol #1, and a symbol #2 is occupied in time domain, a start location is the symbol #0 in which a system frame number is 0 and a slot is 0. Correspondingly, the second node monitors, at a moment specified by the control information occasion information, the control information that may be sent from the first node. The BWP may also be referred to as bandwidth adaptation, and means that a network side configures a segment of continuous spectrum resources for a terminal device, and the terminal device transmits data on the BWP. In this embodiment, the second node may communicate with the first node based on a BWP configuration in a protocol. It needs to be noted that time-frequency resources specified by the control information occasion are resources reserved for the first node to send the control information to the second node, but it does not indicate that these resources are always used. These resources are used only when the first node needs to send the control information.

In a possible implementation, the first node may alternatively send the control information to the second node in a manner of initiating a paging. In this case, the second node may determine a paging occasion (PO) based on identifier information that is of the second node and that is assigned by the first node and according to a predefined rule, and then detect and receive, at a corresponding time-frequency location, the control information delivered by the second node. The identifier information of the second node may be a pseudo identifier, for example, may be a temporary mobile subscriber identity (serving-temporary mobile subscriber identity, S-TSMI).

For example, a system frame number (SFN) of control information in which a PO detected by the second node in a discontinuous reception (discontinuous transmission, DRX) periodicity is located, an index of the PO in the control information corresponding to the SFN, and the like may be determined by using the following formulas.

The SFN of the control information satisfies:

$$(SFN + \text{PF\_offset})\bmod T = \left(\frac{T}{N}\right) * (\text{SR\_ID} \bmod N) \quad \text{(Formula 1)}$$

The index $i_s$ of the PO in the SFN satisfies:

$$i_s = \text{floor}\left(\frac{\text{SR\_ID}}{N}\right)\bmod N_s \quad \text{(Formula 2)}$$

In the formulas, the SFN represents the system frame number of the control information, PF_offset represents an offset of the control information, T represents a DRX cycle, N represents a total amount of control information included in one DRX cycle, $N_s$ represents a quantity of POs included in one piece of control information, mod represents a modulo operation, SR_ID represents a value obtained based on identifier information (identity number, ID) of the second node, and floor(x) represents rounding x down. PF_offset, T, N, $N_s$, and the like are all configured by the first node, and SR_ID is determined based on the ID of the second node.

The N sets of beamforming BF parameter information supported by the second node may be N sets of BF parameters supported by the second node, or may be an index value. The index value indicates the N sets of the BF parameters supported by the second node. When the node configuration information of the second node does not include the N sets of the beamforming BF parameter information supported by the second node, the N sets of the beamforming BF parameter information supported by the second node may be preset in the second node. The BF parameter includes one or more of the following: a phase and an amplitude, where the BF parameter is used to set a signal phase and the amplitude on an antenna element on the second node.

A quantity of sets of the BF parameters supported by the second node is N, or quantities of sets of BF parameters supported by the second node in different subcarrier spacings and/or frequency bands may be determined by the first node based on forwarding capability information of the second node, where the quantity of sets of the BF parameters supported by the second node is greater than or equal to a quantity of beams in the second beam set or a quantity of sets of BF parameters used by the second node. The BF parameter is used to generate a beam in the second beam set. The forwarding capability information of the second node may be reported by the second node to the first node. The forwarding capability information of the second node may be carried in capability information of the second node. The capability information of the second node may further include one or more of the following: a specification of the second node, the frequency band amplification and suppression information of the second node, and maximum uplink and downlink transmit power of the second node.

The frequency band amplification and suppression information of the second node may be frequency band amplification and suppression information of the RU module in the second node, and may include one or more of the following: a passband bandwidth, a gain, and stopband suppression of a filter module of the RU module in the second node.

In a possible implementation, the method further includes: The first node generates system information (SI), where the SI includes index information of the at least one beam in the first beam set. Next, the first node may send SI change indication information to the second node. Then, the first node may send the SI in a broadcast manner. A beam in the first beam set may be an SSB. The index information of the beam in the first beam set may include index information of a newly added SSB and index information of the BH-SSB. In an air interface downlink direction, the second node does not generate a signal, but only forwards a signal received from the first node. The second node scans SSBs in coverage of the second node by forwarding the plurality of SSBs received from the first node. Therefore, when the first node admits a signal relay service provided by the second node for a terminal device in coverage of the first node, in each SSB burst (SSB burst) periodicity, the first node needs to additionally increase a quantity of SSBs to be sent, namely, newly added SSBs. For the newly added SSBs, the first node needs to update system information blocks (SIBs), for example, bitmaps (Bitmaps) indicating SSB information currently sent by a cell in a system information block 1 (system information block 1, SIB1) and a system information block 2 (system information block 2, SIB2). If a bit is 1, it indicates that an SSB corresponding to an index is currently sent, or if a bit is not 1, an SSB is not sent. There are three optional formats of the bitmap indicating sending or measurement of the SSB: a short bitmap (shortBitmap), a medium bitmap (mediumBitmap), and a long bitmap (longBitmap), which are respectively bit strings of 4, 8, and 64 bits. Optionally, the bitmap is further extended to a bitmap including bit strings of 16 bits and/or 32 bits, to flexibly support a requirement of increasing the quantity of SSBs after the second node accesses a system.

The quantity of newly added SSBs depends on a quantity of SSBs forwarded by the second node by scanning the SSBs in the coverage of the second node. If the quantity of the SSBs forwarded by the second node by scanning the SSBs in the coverage of the second node is Q, the first node needs to newly add Q−1 SSBs, where Q is greater than or equal to 1. The first node determines a BH-SSB, for example, an SSBx, that is, an index of the SSB is x. The first node sends the newly added Q−1 SSBs in a sending direction the same as that of the BH-SSB and by using a beamforming parameter that is the same as that for sending the BH-SSB, so that the second node can receive Q SSBs, and forward the Q SSBs to an air interface based on the node configuration information, to scan the SSBs in the coverage of the second node.

Figure 8:
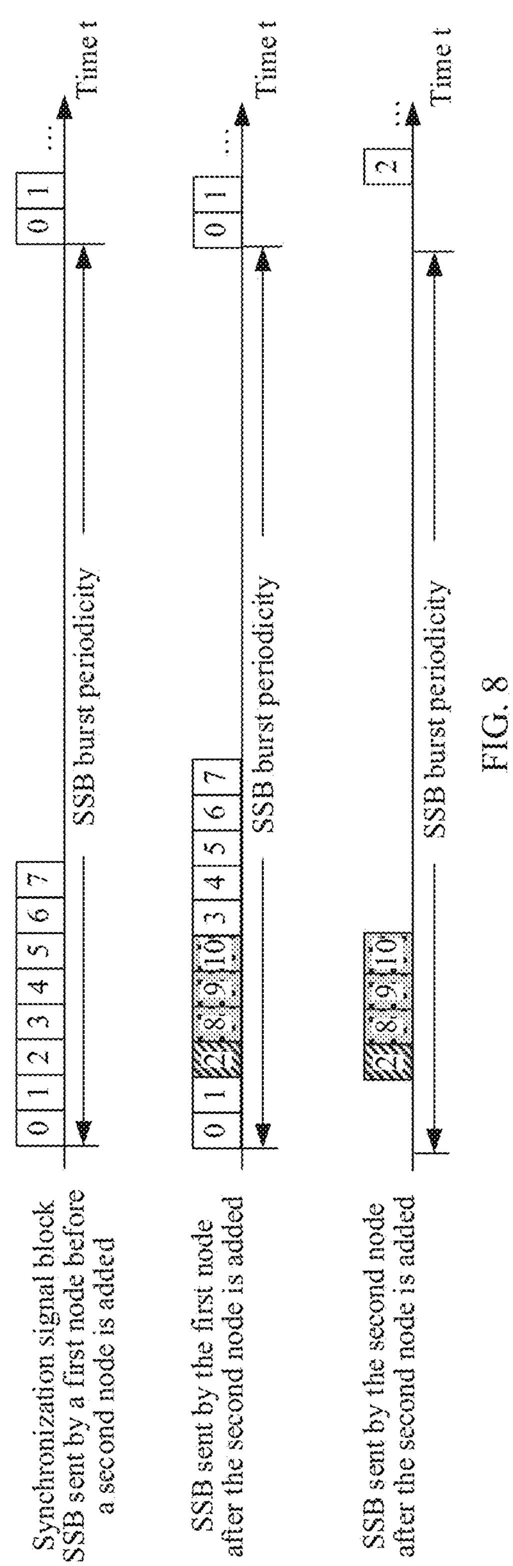
FIG. 8 is a diagram of sending an SSB according to an embodiment of this application.
Figure 9:
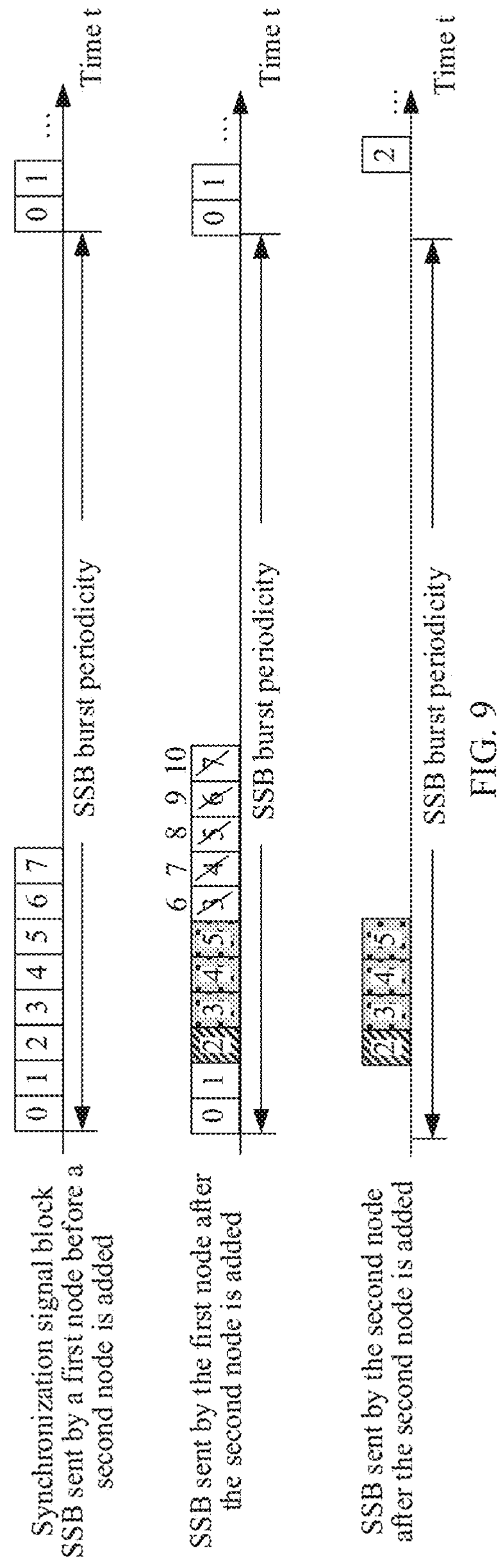
FIG. 9 is a diagram of sending an SSB according to an embodiment of this application.

In a possible implementation, the first node may continuously send beams in the first beam set in time. In an example, a beam in the first beam set may be an SSB, and the beam in the first beam set includes a newly added SSB and/or BH-SSB. In the following embodiment, a case before the second node is added is a case before the second node is connected to the first node in an initial access process, and completes a related configuration to normally perform beam forwarding; and a case after the second node is added is a case after the second node is connected to the first node in the initial access process, and completes the related configuration to normally perform beam forwarding. The SSB burst periodicity is an SSB scanning periodicity, and may also be referred to as an SSB periodicity. As shown in FIG. 8, it is assumed that before the second node is added, that is, the first node admits the second node, the first node broadcasts eight SSBs in each SSB burst periodicity, a BH-SSB of the second node is an SSB2, and a quantity M of forwarded SSBs is equal to 4. After the second node is added, that is, the first node admits the signal relay service provided by the second node, a quantity of SSBs sent by the first node increases from 8 to 11, three newly added SSBs are inserted immediately after the BH-SSB, and the three newly added SSBs may be an SSB8, an SSB9, and an SSB10. In other words, that the first node continuously sends beams in the first beam set in time may mean that the first node continuously sends the SSB2 and the SSB8 to the SSB10. Correspondingly, the second node continuously receives the beams in the first beam set in time, that is, continuously receives the SSB2 and the SSB8 to the SSB10 in time. Then, the second node may continuously send the beams in the second beam set in time, that is, continuously send the SSB2 and the SSB8 to the SSB10 in time. In another example, as shown in FIG. 9, it is assumed that before the second node is added, that is, the first node admits the second node, the first node broadcasts eight SSBs in each SSB burst periodicity, a BH-SSB of the second node is an SSB2, and a quantity M of forwarded SSBs is 4. After the second node is added, that is, the first node admits the signal relay service provided by the second node, a quantity of SSBs sent by the first node increases from 8 to 11, three newly added SSBs may be an SSB3, an SSB4, and an SSB5, and indexes of the original SSB3 to SSB7 are modified to 6 to 10 in sequence. Correspondingly, that the first node continuously sends beams in the first beam set in time means that the first node continuously sends the SSB2 to the SSB5 in time. Correspondingly, the second node may continuously receive the beams in the first beam set in time, that is, continuously receive the SSB2 to the SSB5 in time. Then, the second node continuously sends the beams in the second beam set in time, that is, continuously send the SSB2 to the SSB5 in time.

Figure 10:
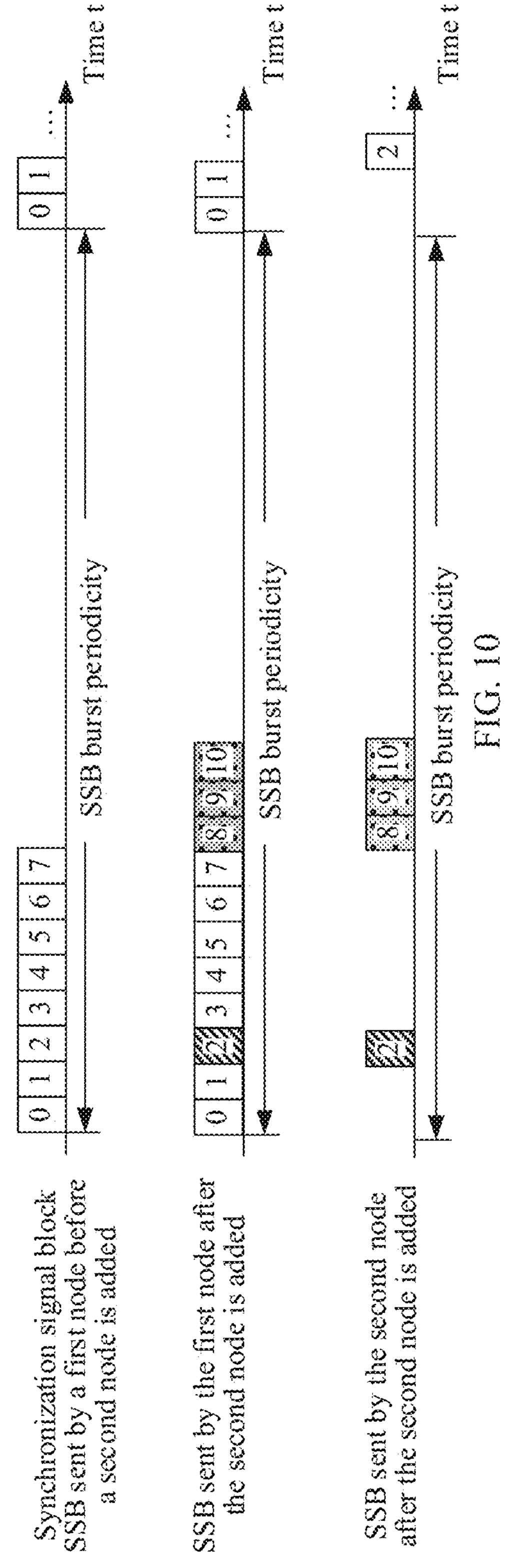
FIG. 10 is a diagram of sending an SSB according to an embodiment of this application.

In another possible implementation, the first node discontinuously sends beams in the first beam set in time. In an example, as shown in FIG. 10, it is assumed that before the second node is added, that is, the first node admits the second node, the first node broadcasts eight SSBs in each SSB burst periodicity, a BH-SSB of the second node is an SSB2, and a quantity M of forwarded SSBs is 4. After the second node is added, that is, the first node admits the signal relay service provided by the second node, a quantity of SSBs sent by the first node increases from 8 to 11, and three newly added SSBs are inserted immediately after the SSB7. That is, the first node may sequentially send the SSB8 to the SSB10 after the SSB7 in an ascending order of SSB indexes. In other words, the first node first sends the SSB2, and then sends the SSB8 to the SSB10 after a period of time, and the second node first receives and forwards the SSB2 from the first node, and receives and forwards the SSB8 to the SSB10 from the first node after a period of time.

In a possible implementation, when the forwarding configuration information in the node configuration information cannot be preset in the second node, the first node first generates the configuration information, and sends the node configuration information to the second node, and the second node performs configuration based on the node configuration information and the forwarding configuration information in the node configuration information. Next, the first node generates the SI, may then send the SI change indication information to the second node, and then sends the SI to the second node and a third node. Then, the first node sends the first beam set of the first node to the second node. When the forwarding configuration information in the node configuration information is preset in the second node, for example, is preconfigured before delivery, the first node first generates the SI, and may then send the SI change indication information to the second node. Next, the first node sends the SI to the second node and a third node, then generates the configuration information, and sends the node configuration information and the first beam set of the first node to the second node, where the node configuration information may include the forwarding configuration information, used to update the preset forwarding configuration information. Then, the first node sends the first beam set of the first node to the second node.

Step S603: The second node receives the node configuration information from the first node to perform configuration.

After receiving the node configuration information from the first node, the second node may configure the second node based on the node configuration information. For example, the second node may configure a forwarding setting in an SR-RU module in the second node based on the forwarding configuration information in the node configuration information. If the node configuration information is carried in an RRC reconfiguration (RRCReconfiguration) message, after the second node completes the configuration, the second node may send an RRC reconfiguration complete (RRCReconfigurationComplete) message to the first node.

Step S604: The first node sends the first beam set of the first node to the second node.

Step S605: The second node receives the first beam set of the first node from the first node.

Step S606: The second node converts the first beam set into the second beam set of the second node based on the node configuration information.

Specifically, that the second node converts the first beam set into the second beam set of the second node based on the node configuration information may be understood as that the second node determines, based on the node configuration information, to forward the first beam set to form the second beam set of the second node. A beam multiplexing mode in the first beam set includes time division multiplexing or frequency division multiplexing, and a beam multiplexing mode in the second beam set includes spatial division multiplexing.

Step S607: The second node sends the second beam set.

Specifically, after receiving the node configuration information, the second node may forward the second beam set in a TDD manner.

In each downlink transmission periodicity, the second node may forward, to the third node based on the forwarding configuration information, beams that are of signals such as an SSB, a paging message, scheduling control information, and downlink scheduling service data and that are delivered by the first node, to establish a downlink connection and a transmission channel for the third node; and in an uplink transmission periodicity, the second node may forward, to the first node, signals such as random access, an RRC connection, an uplink scheduling request, and service data that are initiated by the third node, to establish an uplink connection and a transmission channel for the third node.

In the method described in FIG. 6, according to this embodiment of this application, after the second node is introduced to provide the relay service, an update change of the SI and specific content of the node configuration information can be implemented. The second node may perform configuration by using the node configuration information to operate. In addition, the method is applied to a smart repeater for smart beam forwarding.

Figure 11:
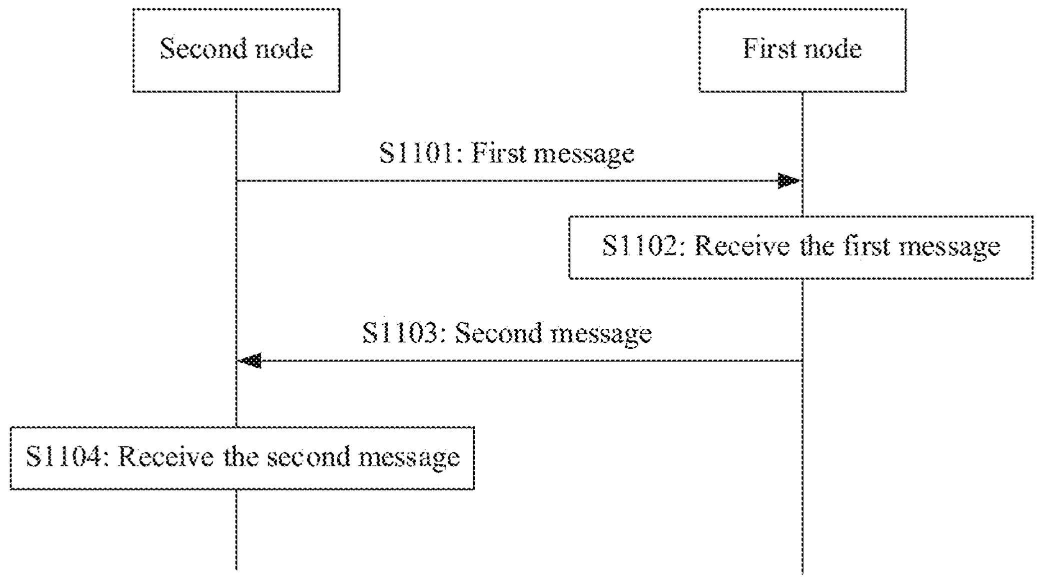
FIG. 11 is a schematic flowchart of a communication method according to an embodiment of this application.

Refer to FIG. 11. FIG. 11 shows a communication method according to an embodiment of this application. The method includes but is not limited to the following steps.

Step S1101: A second node sends a first message to a first node.

Specifically, the first message is for requesting to establish an RRC connection, the first message includes first indication information, and the first indication information indicates that a terminal that initiates the request for establishing the RRC connection is the second node, and may specifically indicate an MT in the second node, namely, an SR-MT.

Specifically, the first message may be an RRC setup request (RRCSetupRequest) message, namely, a message 3 (Msg3) in a 4-step random access (4-step random access) process. The first message includes the first indication information, and the first indication information may indicate a value (for example, "SR-MT-Access") added to an establishment cause (establishmentCause) information element in the RRCSetupRequest message.

In a possible implementation, the first message includes second indication information, and the second indication information indicates identifier information of the second node. The first message may be the RRCSetupRequest message, and the second indication information may be a user equipment identity (ue-Identity) information element in the RRCSetupRequest message. The identifier information of the second node may be understood as identity information of the second node, and may be a temporary mobile subscriber identity (temporary mobile subscriber identity, TMSI). For example, when a value of the identifier information falls within a range of 0 to 80, it indicates that this terminal device is common UE, or when a value of the identifier information falls within a range of 81 to 100, it indicates that this terminal device is the second node; or when the identifier information starts with 000, it indicates that this terminal device is common UE, or when the identifier information starts with 111, it indicates that this terminal device is the second node.

In a possible implementation, the first node may determine, in the following three manners, that the terminal that initiates the request for establishing the RRC connection is the second node. Details are provided as follows. Manner 1: The first message includes the first indication information, and the first indication information indicates that the terminal that initiates the request for establishing the RRC connection is the second node. For example, the first indication information may indicate the value (for example, "SR-MT-Access") added to the establishment cause (establishmentCause) information element in the RRCSetupRequest message. Manner 2: The first message includes the second indication information, the second indication information indicates the identifier information of the second node, and based on a feature or a value range of the identifier information of the second node, it may indicate that the terminal that initiates the request for establishing the RRC connection is the second node. In an example, assuming that the value of the identifier information falls within the range of 0 to 80, it indicates that the terminal device is the common UE, or when the value of the identifier information falls within the range of 81 to 100, it indicates that the terminal device is the second node. Assuming that the identifier information of the second node is 90, because 90 falls within the range of 81 to 100, it is determined, based on the identifier information of the second node, that the terminal that initiates the request for establishing the RRC connection is the second node. Manner 3: The first message includes the first indication information, and the first indication information indicates that the terminal that initiates the request for establishing the RRC connection is the second node. For example, the first indication information may indicate the value (for example, "SR-MT-Access") added to the establishment cause (establishmentCause) information element in the RRCSetupRequest message. The first message further includes the second indication information, and the second indication information indicates the identifier information of the second node.

In a possible implementation, the first message includes second indication information, and the second indication information indicates capability information of the second node. The first message may be the RRCSetupRequest message, and the second indication information may be a user equipment identity (ue-Identity) information element in the RRCSetupRequest message. The capability information of the second node may be one or more of the following: a specification of the second node, maximum uplink and downlink transmit power of the second node, forwarding capability information of the second node, and frequency band amplification and suppression information of the second node. The forwarding capability information of the second node includes a maximum quantity of beams capable of being forwarded by the second node, quantities of beams forwarded by the second node in different subcarrier spacings and/or different frequency bands, and the different subcarrier spacings and/or the different frequency bands supported by the second node.

In a possible implementation, the second indication information includes an information field, and a structure corresponding to the information field is used to define the capability information of the second node. The first message may be the RRCSetupRequest message, and the second indication information may be the ue-Identity information element in the RRCSetupRequest message. An information field, for example, a name of a "second node-Capability" field, is newly added under the ue-Identity information element, and a structure, for example, a name of a "second node-Capability" structure, is defined under the newly added information field to specifically define the capability information of the second node.

In another possible implementation, the second indication information includes a bit sequence, and the bit sequence indicates the capability information of the second node. The first message may be the RRCSetupRequest message, and the second indication information may be the ue-Identity information element in the RRCSetupRequest message. The ue-Identity information element may carry information with a size of 39 bits. In an example, it is assumed that the capability information of the second node includes the specification of the second node, the maximum uplink and downlink transmit power of the second node, the forwarding capability information of the second node, and the frequency band amplification and suppression information of the second node. The forwarding capability information of the second node includes the maximum quantity of the beams capable of being forwarded by the second node, the quantities of the beams forwarded by the second node in the different subcarrier spacings and/or the different frequency bands, and the different subcarrier spacings and/or the different frequency bands supported by the second node. The $1^{st}$ to $3^{rd}$ bits of the ue-Identity information element indicate the specification of the second node; and the $4^{th}$ to $6^{th}$ bits indicate the maximum uplink and downlink transmit power of the second node, the $6^{th}$ to $9^{th}$ bits indicate the forwarding capability information of the second node, and the $10^{th}$ to $12^{th}$ bits indicate the frequency band amplification and suppression information of the second node.

In another possible implementation, the second indication information includes an index value, and the index value indicates the capability information of the second node. The first message may be the RRCSetupRequest message, and the second indication information may be a random value (random Value) information element in the RRCSetupRequest message. An index value is assigned to the random Value information element. Correspondingly, after receiving the first message, the first node determines the index value of the random Value information element, and makes an inquiry about the locally stored capability information of the second node or makes an inquiry about the capability information of the second node from a core network based on the index value.

In a possible implementation, before the second node sends the first message to the first node, the first node performs periodic synchronization signal and physical broadcast channel block (SSB) beam scanning, which may also be referred to as synchronization signal block beam scanning. Correspondingly, the second node detects an SSB on a corresponding frequency, determines a physical cell identifier (PCI), establishes downlink (DL) synchronization, decodes a master information block (MIB) and a system information block type 1 (SIB1), and determines physical random access channel (PRACH) configuration information; and then, the second node initiates a random access (RA) process based on the PRACH configuration information, and sends, to the first node at a corresponding time-frequency location, an RA preamble, namely, a message 1 (Msg1). Correspondingly, the first node receives the Msg1 from the second node, and sends, to the second node, an RA response message, namely, a message 2 (Msg2).

Step S1102: The first node receives the first message from the second node.

Step S1103: The first node sends a second message to the second node.

Specifically, the second message may be an RRC setup (RRCSetup) message, namely, a message 4 (Msg4) in a 4-step random access process.

In a possible implementation, the second message includes a first value, and the first value is used to verify the identity information of the second node. The first value may be a non-repeated random number used once (Nonce).

In this manner, because there is a different first value in each authentication process, an authentication message can be protected against replay attacks.

Step S1104: The second node receives the second message from the first node.

In a possible implementation, the second message includes a first value, and the method further includes: The second node generates a first response number based on the first value and a private key in a digital certificate. Then, the second node sends a third message to the first node, where the third message includes the first response number, and the first response number is used by the first node to verify the identity information of the second node. Correspondingly, the third message received by the first node from the second node includes the first response number. The first node obtains a public key of the second node, where the public key is preconfigured by a network management function (operations, administration and maintenance, OAM) network element or is requested by the first node from an OAM network element. The first node verifies the first response number based on the first value and the public key, to determine the identity information of the second node. The identity information of the second node may be verified by using the second node; or may be verified through a network, but a network management system needs to participate.

The digital certificate may be pre-installed in the second node, and the third message may be an RRC setup complete (RRCsetupComplete) message, namely, a message 5 (Msg5). The public key and the private key may be a key pair obtained according to a predefined rule. That the first node verifies the first response number based on the first value and the public key, to determine the identity information of the second node may mean that the first node determines the private key based on the public key, and then generates a response number based on the private key and the first value. If the response number is the first response number, it indicates that the verification succeeds, an identity of the second node is confirmed, and the second node is allowed to access the network to provide a relay service; or if the response number is not the first response number, it indicates that the verification fails, and the second node is refused to access the network to provide a relay service.

In a possible implementation, the third message includes capability information of the second node. That is, when being allowed by message space of the third message, the capability information of the second node may be carried in the third message.

In another possible implementation, the method further includes: The first node sends a capability inquiry message to the second node. Correspondingly, the second node receives the capability inquiry message from the first node, and then sends the capability information of the second node to the first node. It may be understood as that when the capability information of the second node is not allowed by the message space of the third message to carry, the first node initiates a capability inquiry process to the second node, and sends a capability inquiry message to the second node, where the capability inquiry message may be a capability inquiry (SR CapabilityInquiry) message of the second node. The second node sends the capability information of the second node to the first node, where the capability information of the second node may be carried in an SR capability information (SRCapabilityInformation) message.

In the method described in FIG. 11, the verification of the identity information of the second node and initial access of the second node are not described in a current protocol standard of the second node. The first message carries the first indication information, the second indication information, and the like, so that the initial access of the second node can be completed, thereby simplifying a signaling exchange process, and reducing signaling overheads.

Figure 12:
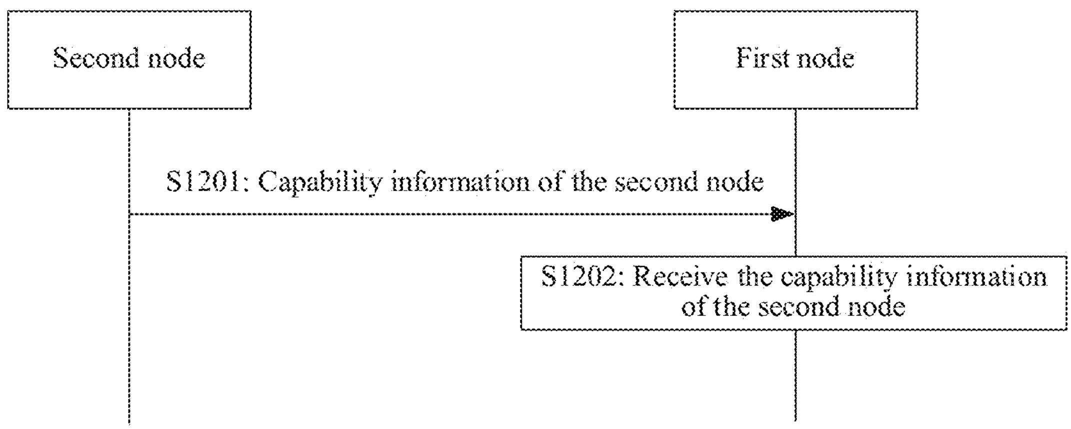
FIG. 12 is a schematic flowchart of a communication method according to an embodiment of this application.

Refer to FIG. 12. FIG. 12 shows a communication method according to an embodiment of this application. The method includes but is not limited to the following steps.

Step S1201: A second node sends capability information of the second node to a first node.

The capability information of the second node includes forwarding capability information of the second node. The capability information of the second node further includes one or more of the following: a specification of the second node, frequency band amplification and suppression information of the second node, and maximum uplink and downlink transmit power of the second node.

The forwarding capability information of the second node includes one or more of the following: a maximum quantity of beams capable of being forwarded by the second node, quantities of beams forwarded by the second node in different subcarrier spacings and/or different frequency bands, and the different subcarrier spacings and/or the different frequency bands supported by the second node.

Step S1202: The first node receives the capability information of the second node from the second node.

In the method described in FIG. 12, the second node reports the capability information of the second node to the first node, so that a signaling exchange process can be simplified, and signaling overheads can be reduced.

Figures 13, 14:
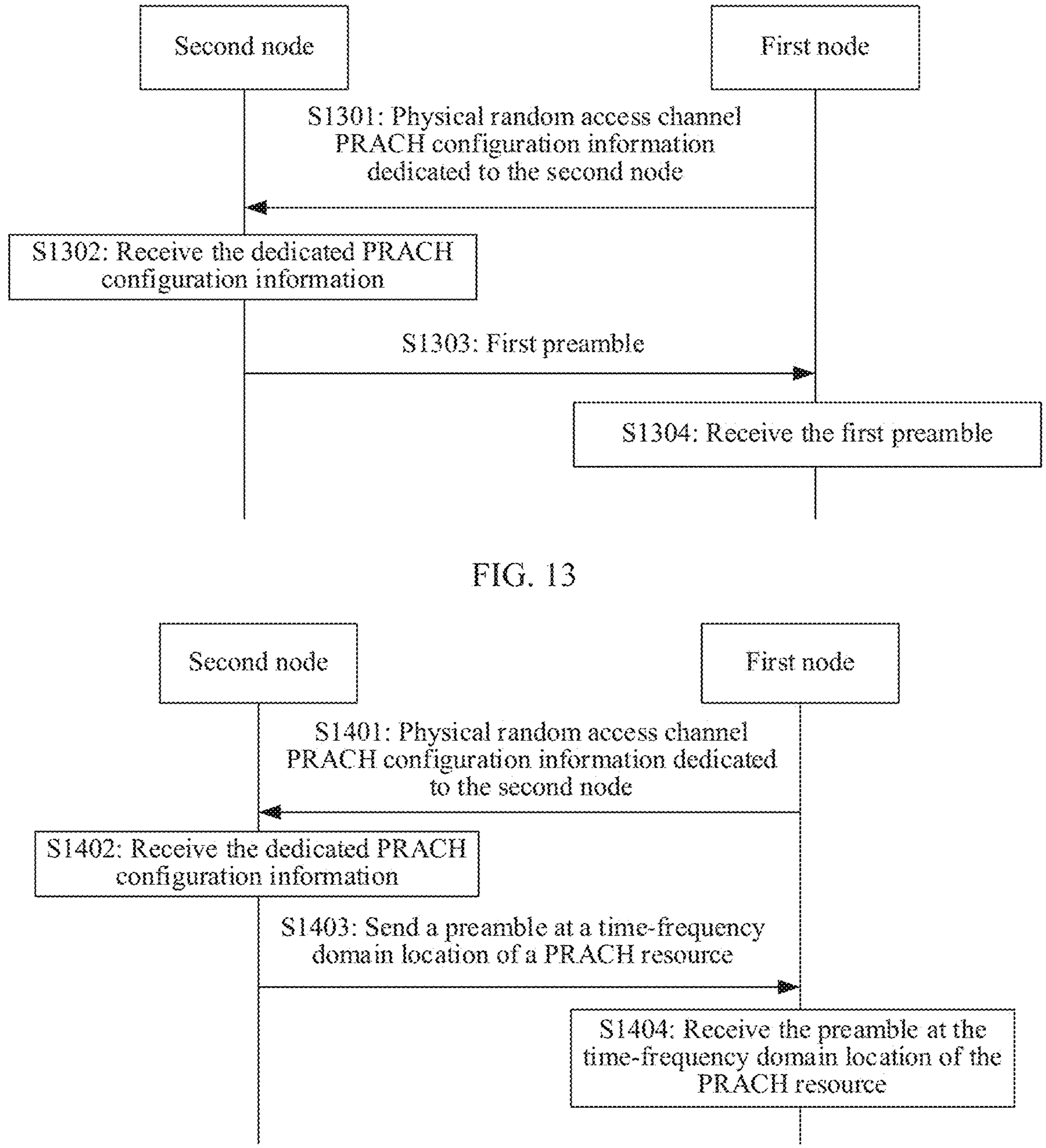
FIG. 13 is a schematic flowchart of a communication method according to an embodiment of this application.
FIG. 14 is a schematic flowchart of a communication method according to an embodiment of this application.

Refer to FIG. 13. FIG. 13 shows a communication method according to an embodiment of this application. The method includes but is not limited to the following steps.

Step S1301: A first node sends, to a second node, physical random access channel PRACH configuration information dedicated to the second node.

The physical random access channel (PRACH) configuration information includes a first preamble, and the first preamble is a dedicated random access preamble for the second node. The PRACH configuration information may further include a time-frequency domain location of a PRACH resource.

Step S1302: The second node receives the dedicated PRACH configuration information from the first node.

Step S1303: The second node sends the first preamble to the first node.

In a possible implementation, the PRACH configuration information further includes the time-frequency domain location of the PRACH resource. That the second node sends the first preamble to the first node includes: The second node sends the preamble to the first node at the time-frequency domain location of the PRACH resource. That the second node sends the preamble to the first node at the time-frequency domain location of the PRACH resource may mean that the second node sends, to the first node at the time-frequency domain location of the PRACH resource, the first preamble, namely, the dedicated random access preamble for the second node; or the second node sends the preamble to the first node at the time-frequency domain location of the PRACH resource, where the preamble is a common UE random access preamble.

Step S1304: The first node receives the first preamble from the second node.

After receiving the first preamble from the second node, the first node may determine, based on the first preamble and/or the dedicated PRACH time-frequency domain location, that a terminal that initiates a request is the second node. Specifically, an MT in the second node may be indicated.

Depending on whether a process of verifying identity information of the second node is included in a protocol agreement between the second node and the first node, subsequent steps are performed with reference to the embodiment shown in FIG. 11. In the foregoing steps, the first preamble and/or the dedicated PRACH time-frequency domain location indicate/indicates that the terminal that initiates the request is the second node. Therefore, in a subsequent process, indication information indicating that the terminal that initiates the request is the second node does not need to be reported.

In the method described in FIG. 13, the first node configures the dedicated PRACH configuration information for the second node, where the configuration information includes the first preamble. Correspondingly, in a manner in which the second node sends the first preamble to the first node, signaling overheads can be reduced.

Refer to FIG. 14. FIG. 14 shows a communication method according to an embodiment of this application. The method includes but is not limited to the following steps.

Step S1401: A first node sends, to a second node, physical random access channel PRACH configuration information dedicated to the second node.

The PRACH configuration information includes a time-frequency domain location of a PRACH resource.

Step S1402: The second node receives the dedicated PRACH configuration information from the first node.

Step S1403: The second node sends a preamble to the first node at the time-frequency domain location of the PRACH resource.

The preamble may be a first preamble, namely, a dedicated random access preamble for the second node; or the preamble may be a common preamble, namely, a common UE random access preamble.

Step S1404: The first node receives the preamble from the second node at the time-frequency domain location of the PRACH resource.

After receiving the preamble from the second node at the time-frequency domain location of the PRACH resource, the first node may determine that a terminal that initiates a request is the second node. Specifically, an MT in the second node may be indicated.

Depending on whether a process of verifying identity information of the second node is included in a protocol agreement between the second node and the first node, subsequent steps are performed with reference to the embodiment shown in FIG. 11. In the foregoing steps, the first preamble and/or the dedicated PRACH time-frequency domain location indicate/indicates that the terminal that initiates the request is the second node. Therefore, in a subsequent process, indication information indicating that the terminal that initiates the request is the second node does not need to be reported.

In the method described in FIG. 14, the first node configures the dedicated PRACH configuration information for the second node, where the configuration information includes the time-frequency domain location of the PRACH resource. Correspondingly, in a manner in which the second node sends the preamble to the first node at the time-frequency domain location of the PRACH resource, signaling overheads can be reduced.

The methods in embodiments of this application are described in detail above. Apparatuses in embodiments of this application are provided below.

Figure 15:
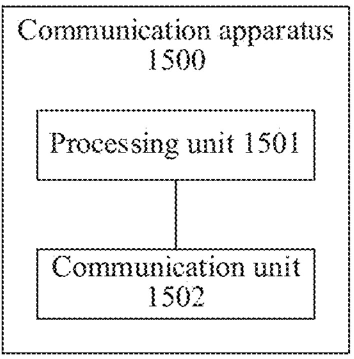
FIG. 15 is a diagram of a structure of a communication apparatus according to an embodiment of this application.

FIG. 15 is a diagram of a structure of a communication apparatus 1500 according to an embodiment of this application. The communication apparatus 1500 may include a processing unit 1501 and a communication unit 1502. Detailed descriptions of the units are provided as follows.

The processing unit 1501 is configured to generate node configuration information.

The communication unit 1502 is configured to send the node configuration information to a second node, where the node configuration information is used for conversion of a first beam set of the apparatus into a second beam set of the second node, and the first beam set and the second beam set each include at least one beam.

The communication unit 1502 is configured to send the first beam set.

In a possible implementation, a beam multiplexing mode in the first beam set includes time division multiplexing or frequency division multiplexing, and a beam multiplexing mode in the second beam set includes spatial division multiplexing.

In another possible implementation, the node configuration information includes at least one of the following: forwarding configuration information, power control information, control information occasion information, N sets of beamforming BF parameter information supported by the second node, and frequency band amplification and suppression information of the second node, where N is greater than or equal to 1, the control information occasion information indicates a time-frequency resource location at which the apparatus sends control information to the second node, the BF parameter information includes one or more of a phase offset, an amplitude, and an index, and the index indicates the phase offset and/or an amplitude parameter.

In another possible implementation, the forwarding configuration information includes at least one or more of the following: forwarding start time information, first duration information, first indication information, time forwarding pattern information of the second node, and direction forwarding pattern information of the second node.

The first duration information indicates use duration of a first BF parameter, the use duration of the first BF parameter is equal to sending duration of a first beam in the second beam set, the first indication information indicates a quantity of beams in the second beam set, the time forwarding pattern information of the second node indicates a time location of a forwarded beam in the second beam set, and the direction forwarding pattern information of the second node indicates a BF parameter used for forwarding each beam in the second beam set.

In another possible implementation, the quantity of the beams in the second beam set is equal to a quantity of sets of BF parameters used by the second node, and the quantity of sets of the BF parameters used by the second node is less than or equal to N.

In another possible implementation, the forwarding start time information includes identifier information of a first beam in the first beam set, or a first interval and start orthogonal frequency division multiplexing OFDM symbol information.

The identifier information of the first beam indicates that forwarding starts from time corresponding to the first beam, the first interval indicates a quantity of slots between a slot in which the node configuration information is received and a forwarding start slot, and the start OFDM symbol information indicates a forwarding start OFDM symbol in the forwarding start slot.

In another possible implementation, the first indication information includes at least one of the following: a subcarrier spacing, a frequency band, cell identifier information, and K, where K is greater than or equal to 1.

In another possible implementation, the node configuration information is carried in radio resource control RRC layer signaling, downlink control information DCI of a physical downlink control channel, or a media access control MAC control element CE.

In another possible implementation, the processing unit 1501 is further configured to generate system information SI, where the SI includes index information of the at least one beam in the first beam set. The communication unit 1502 is further configured to send the SI.

In another possible implementation, the communication unit 1502 is further configured to send SI change indication information to the second node.

In another possible implementation, the communication unit 1502 is further configured to continuously send beams in the first beam set in time.

In another possible implementation, the processing unit 1501 is further configured to: determine, based on forwarding capability information of the second node, that a quantity of sets of BF parameters supported by the second node is N, or determine, in different subcarrier spacings and/or different frequency bands, quantities of sets of BF parameters supported by the second node.

In another possible implementation, the quantity of sets of the BF parameters supported by the second node is greater than or equal to the quantity of the beams in the second beam set or the quantity of sets of the BF parameters used by the second node.

It needs to be noted that, for implementations and beneficial effects of the units, refer to corresponding descriptions in the method embodiment shown in FIG. 6.

Optionally, detailed descriptions of the units in the communication apparatus 1500 may be further provided as follows.

The communication unit 1502 is configured to receive node configuration information and a first beam set of a first node from the first node.

The processing unit 1501 is configured to convert the first beam set into a second beam set of the apparatus based on the node configuration information, where the first beam set and the second beam set each include at least one beam.

The communication unit 1502 is configured to send the second beam set.

In a possible implementation, the processing unit 1501 is configured to determine, based on the node configuration, to forward the first beam set to form the second beam set of the apparatus.

In another possible implementation, a beam multiplexing mode in the first beam set includes time division multiplexing or frequency division multiplexing, and a beam multiplexing mode in the second beam set includes spatial division multiplexing.

In another possible implementation, the node configuration information includes at least one of the following: forwarding configuration information, power control information, control information occasion information, N sets of beamforming BF parameter information supported by the apparatus, and frequency band amplification and suppression information of a second node, where N is greater than or equal to 1, the control information occasion information indicates a time-frequency resource location at which the apparatus receives control information from the first node, the BF parameter includes one or more of a phase offset, an amplitude, and an index, and the index indicates the phase offset and/or an amplitude parameter.

In another possible implementation, the forwarding configuration information includes at least one of the following:

forwarding start time information, first duration information, first indication information, time forwarding pattern information of the apparatus, and direction forwarding pattern information of the apparatus. The first duration information indicates sending duration for which the apparatus sends a first beam in the second beam set by using a first BF parameter, the first indication information indicates a quantity of beams in the second beam set, and the time forwarding pattern information of the apparatus indicates time locations at which the apparatus forwards the second beam set from forwarding start time; and the direction forwarding pattern information of the apparatus indicates BF parameters used by the apparatus to forward the second beam set.

In another possible implementation, the quantity of the beams in the second beam set is equal to a quantity of sets of the BF parameters used by the apparatus, and the quantity of sets of the BF parameters used by the apparatus is less than or equal to N.

In another possible implementation, the forwarding start time information includes identifier information of a first beam in the first beam set, or a first interval and start orthogonal frequency division multiplexing OFDM symbol information. The identifier information of the first beam indicates that the apparatus starts to forward the second beam set from time corresponding to the first beam, the first interval indicates a quantity of slots between a slot in which the apparatus receives the node configuration information and a forwarding start slot, and the start OFDM symbol information indicates a forwarding start OFDM symbol in the forwarding start slot.

In another possible implementation, the first indication information includes at least one of the following: a subcarrier spacing, a frequency band, cell identifier information, and K, where K is greater than or equal to 1.

In another possible implementation, the time forwarding pattern information of the apparatus includes a first bitmap, and a bit in the first bitmap corresponds to a unit interval. When a value of a bit in the first bitmap is a first preset value, the communication unit 1502 is configured to forward a beam in the second beam set at a unit interval corresponding to the bit.

In another possible implementation, the direction forwarding pattern information of the apparatus includes a second bitmap, and a bit in the second bitmap corresponds to a set of BF parameters. When a value of a bit in the second bitmap is a second preset value, the communication unit 1502 is configured to forward a beam in the second beam set by using a set of BF parameters corresponding to the bit.

In another possible implementation, the control information occasion information includes at least one of the following: a time periodicity, a frequency domain resource block, a quantity of occupied orthogonal frequency division multiplexing OFDM symbols, and a time start location.

In another possible implementation, the node configuration information is carried in radio resource control RRC layer signaling, downlink control information DCI of a physical downlink control channel, or a media access control MAC control element CE.

In another possible implementation, the communication unit 1502 is further configured to receive system information SI from the first node, where the SI includes index information of the at least one beam in the first beam set.

In another possible implementation, the communication unit 1502 is further configured to receive SI change indication information from the first node.

In another possible implementation, the communication unit 1502 is further configured to continuously receive beams in the first beam set in time.

In another possible implementation, a control plane protocol stack of the apparatus includes a radio resource control RRC layer, a media access control MAC layer, and a physical PHY layer.

It needs to be noted that, for implementations and beneficial effects of the units, refer to corresponding descriptions in the method embodiment shown in FIG. 6.

Optionally, detailed descriptions of the units in the communication apparatus 1500 may be further provided as follows.

The communication unit 1502 is configured to send a first message to a first node, where the first message is for requesting to establish a radio resource control RRC connection, the first message includes first indication information, and the first indication information indicates that a terminal that initiates the request for establishing the RRC connection is the apparatus.

The communication unit 1502 is configured to receive a second message from the first node.

The processing unit 1501 is configured to establish the RRC connection to the first node based on the second message.

In a possible implementation, the first message includes second indication information, and the second indication information indicates identifier information of the apparatus.

In another possible implementation, the first message includes second indication information, and the second indication information indicates capability information of the apparatus.

In another possible implementation, the second indication information includes an information field, and a structure corresponding to the information field is used to define the capability information of the apparatus.

In another possible implementation, the second indication information includes a bit sequence, and the bit sequence indicates the capability information of the apparatus.

In another possible implementation, the second indication information includes an index value, and the index value indicates the capability information of the apparatus.

In another possible implementation, the second message includes a first value, and the processing unit 1501 is further configured to generate a first response number based on the first value and a private key in a digital certificate. The communication unit 1502 is further configured to send a third message to the first node, where the third message includes the first response number, and the first response number is used by the first node to verify identity information of the apparatus.

In another possible implementation, the third message includes capability information of the apparatus.

In another possible implementation, the communication unit 1502 is further configured to receive a capability inquiry message from the first node. The communication unit 1502 is further configured to send the capability information of the apparatus to the first node.

In another possible implementation, a control plane protocol stack of the apparatus includes a radio resource control RRC layer, a media access control MAC layer, and a physical PHY layer.

It needs to be noted that, for implementations and beneficial effects of the units, refer to corresponding descriptions in the method embodiment shown in FIG. 11.

Optionally, detailed descriptions of the units in the communication apparatus 1500 may be further provided as follows.

The communication unit 1502 is configured to receive a first message from a second node, where the first message is for requesting to establish a radio resource control RRC connection, the first message includes first indication information, and the first indication information indicates that a terminal that initiates the request is the second node.

The communication unit 1502 is configured to send a second message to the second node.

In a possible implementation, the first message includes second indication information, and the second indication information indicates identifier information of the second node.

In another possible implementation, the first message includes second indication information, and the second indication information indicates capability information of the second node.

In another possible implementation, the second indication information includes an information field, and a structure corresponding to the information field is used to define the capability information of the second node.

In another possible implementation, the second indication information includes a bit sequence, and the bit sequence indicates the capability information of the second node.

In another possible implementation, the second indication information includes an index value, and the index value indicates the capability information of the second node.

In another possible implementation, the second message includes a first value, and the first value is used to verify identity information of the second node.

In another possible implementation, the communication unit 1502 is further configured to receive a third message from the second node, where the third message includes a first response number. The processing unit 1501 is further configured to obtain a public key of the second node, where the public key is preconfigured by a network management function OAM network element or is requested from an OAM network element. The processing unit 1501 is configured to verify the first response number based on the first value and the public key, to determine the identity information of the second node.

In another possible implementation, the third message includes capability information of the second node.

In another possible implementation, the communication unit 1502 is further configured to send a capability inquiry message to the second node. The communication unit 1502 is further configured to receive the capability information of the second node from the second node.

It needs to be noted that, for implementations and beneficial effects of the units, refer to corresponding descriptions in the method embodiment shown in FIG. 11.

Optionally, detailed descriptions of the units in the communication apparatus 1500 may be further provided as follows.

The communication unit 1502 is configured to send capability information of the apparatus to a first node, where the capability information includes forwarding capability information of the apparatus.

In a possible implementation, the capability information further includes one or more of the following: a specification of the apparatus, frequency band amplification and suppression information of the apparatus, and maximum uplink and downlink transmit power of the apparatus.

In another possible implementation, the forwarding capability information of the apparatus includes one or more of the following: a maximum quantity of beams capable of being forwarded by the apparatus, quantities of beams forwarded by the apparatus in different subcarrier spacings and/or different frequency bands, and the different subcarrier spacings and/or the different frequency bands supported by the apparatus.

It needs to be noted that, for implementations and beneficial effects of the units, refer to corresponding descriptions in the method embodiment shown in FIG. 12.

Optionally, detailed descriptions of the units in the communication apparatus 1500 may be further provided as follows.

The communication unit 1502 is configured to receive capability information from a second node, where the capability information includes forwarding capability information of the second node.

In a possible implementation, the capability information further includes one or more of the following: a specification of the second node, frequency band amplification or outband suppression of the second node, and maximum uplink and downlink transmit power of the second node.

In another possible implementation, the forwarding capability information of the second node includes one or more of the following: a maximum quantity of beams capable of being forwarded by the second node, quantities of beams forwarded by the second node in different subcarrier spacings and/or different frequency bands, and the different subcarrier spacings and/or the different frequency bands supported by the second node.

It needs to be noted that, for implementations and beneficial effects of the units, refer to corresponding descriptions in the method embodiment shown in FIG. 12.

Optionally, detailed descriptions of the units in the communication apparatus 1500 may be further provided as follows.

The communication unit 1502 is configured to receive, from a first node, physical random access channel PRACH configuration information dedicated to a second node, where the PRACH configuration information includes a first preamble.

The communication unit 1502 is configured to send the first preamble to the first node.

In a possible implementation, the PRACH configuration information further includes a time-frequency domain location of a PRACH resource. The communication unit 1502 is configured to send a preamble to the first node at the time-frequency domain location of the PRACH resource.

It needs to be noted that, for implementations and beneficial effects of the units, refer to corresponding descriptions in the method embodiment shown in FIG. 13.

Optionally, detailed descriptions of the units in the communication apparatus 1500 may be further provided as follows.

The communication unit 1502 is configured to send, to a second node, physical random access channel PRACH configuration information dedicated to the second node, where the PRACH configuration information includes a first preamble.

The communication unit 1502 is configured to receive the first preamble from the second node.

In a possible implementation, the PRACH configuration information further includes a time-frequency domain location of a PRACH resource, and the communication unit 1502 is configured to receive the preamble from the second node at the time-frequency domain location of the PRACH resource.

It needs to be noted that, for implementations and beneficial effects of the units, refer to corresponding descriptions in the method embodiment shown in FIG. 13.

Optionally, detailed descriptions of the units in the communication apparatus 1500 may be further provided as follows.

The communication unit 1502 is configured to receive, from a first node, physical random access channel PRACH configuration information dedicated to a second node, where the PRACH configuration information includes a time-frequency domain location of a PRACH resource.

The communication unit 1502 is configured to send a preamble to the first node at the time-frequency domain location of the PRACH resource.

It needs to be noted that, for implementations and beneficial effects of the units, refer to corresponding descriptions in the method embodiment shown in FIG. 14.

Optionally, detailed descriptions of the units in the communication apparatus 1500 may be further provided as follows.

The communication unit 1502 is configured to send, to a second node, physical random access channel PRACH configuration information dedicated to the second node, where the PRACH configuration information includes a time-frequency domain location of a PRACH resource.

The communication unit 1502 is configured to receive a preamble from the second node at the time-frequency domain location of the PRACH resource.

It needs to be noted that, for implementations and beneficial effects of the units, refer to corresponding descriptions in the method embodiment shown in FIG. 14.

Figure 16:
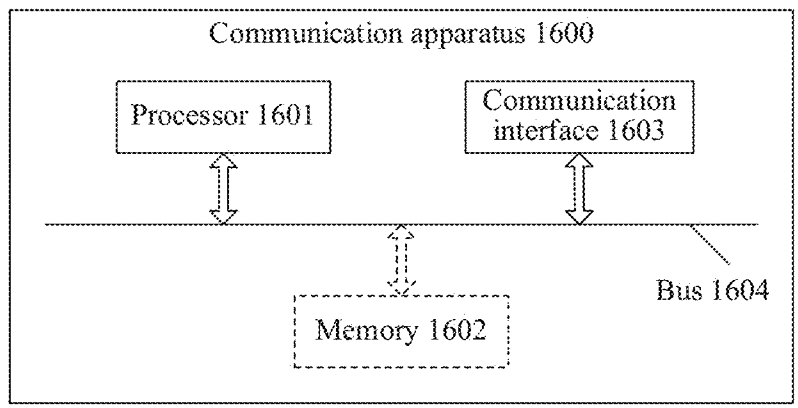
FIG. 16 is a diagram of a structure of a communication apparatus according to an embodiment of this application.

FIG. 16 shows a communication apparatus 1600 according to an embodiment of this application. The communication apparatus 1600 includes at least one processor 1601 and a communication interface 1603, and optionally further includes a memory 1602. The processor 1601, the memory 1602, and the communication interface 1603 are connected to each other through a bus 1604.

The memory 1602 includes but is not limited to a random access memory (RAM), a read-only memory (ROM), an erasable programmable read-only memory (EPROM), or a compact disc read-only memory (CD-ROM). The memory 1602 is configured to store a related computer program and data. The communication interface 1603 is configured to: receive and send data.

The processor 1601 may be one or more central processing units (CPUs). When the processor 1601 is a CPU, the CPU may be a single-core CPU or a multi-core CPU.

The processor 1601 in the communication apparatus 1600 is configured to read computer program code stored in the memory 1602, to perform the following operations:

generating node configuration information;

sending the node configuration information to a second node through the communication interface 1603, where the node configuration information is used for conversion of a first beam set of the apparatus into a second beam set of the second node, and the first beam set and the second beam set each include at least one beam; and sending the first beam set.

In a possible implementation, a beam multiplexing mode in the first beam set includes time division multiplexing or frequency division multiplexing, and a beam multiplexing mode in the second beam set includes spatial division multiplexing.

In another possible implementation, the node configuration information includes at least one of the following: forwarding configuration information, power control information, control information occasion information, N sets of beamforming BF parameter information supported by the second node, and frequency band amplification and suppression information of the second node, where N is greater than or equal to 1, the control information occasion information indicates a time-frequency resource location at which the apparatus sends control information to the second node, the BF parameter information includes one or more of a phase offset, an amplitude, and an index, and the index indicates the phase offset and/or an amplitude parameter.

In another possible implementation, the forwarding configuration information includes at least one of the following: forwarding start time information, first duration information, first indication information, time forwarding pattern information of the second node, and direction forwarding pattern information of the second node.

The first duration information indicates use duration of a first BF parameter, the use duration of the first BF parameter is equal to sending duration of a first beam in the second beam set, the first indication information indicates a quantity of beams in the second beam set, the time forwarding pattern information of the second node indicates a time location of a forwarded beam in the second beam set, and the direction forwarding pattern information of the second node indicates a BF parameter used for forwarding each beam in the second beam set.

In another possible implementation, the quantity of the beams in the second beam set is equal to a quantity of sets of BF parameters used by the second node, and the quantity of sets of the BF parameters used by the second node is less than or equal to N.

In another possible implementation, the forwarding start time information includes identifier information of a first beam in the first beam set, or a first interval and start orthogonal frequency division multiplexing OFDM symbol information.

The identifier information of the first beam indicates that forwarding starts from time corresponding to the first beam, the first interval indicates a quantity of slots between a slot in which the node configuration information is received and a forwarding start slot, and the start OFDM symbol information indicates a forwarding start OFDM symbol in the forwarding start slot.

In another possible implementation, the first indication information includes at least one of the following: a subcarrier spacing, a frequency band, cell identifier information, and K, where K is greater than or equal to 1.

In another possible implementation, the node configuration information is carried in radio resource control RRC layer signaling, downlink control information DCI of a physical downlink control channel, or a media access control MAC control element CE.

In another possible implementation, the processor 1601 is further configured to: generate system information SI, where the SI includes index information of the at least one beam in the first beam set; and send the SI through the communication interface 1603.

In another possible implementation, the processor 1601 is further configured to send SI change indication information to the second node through the communication interface 1603.

In another possible implementation, the processor 1601 is further configured to continuously send beams in the first beam set in time through the communication interface 1603.

In another possible implementation, the processor 1601 is further configured to: determine, based on forwarding capability information of the second node, that a quantity of sets of BF parameters supported by the second node is N, or determine, in different subcarrier spacings and/or different frequency bands, quantities of sets of BF parameters supported by the second node.

In another possible implementation, the quantity of sets of the BF parameters supported by the second node is greater than or equal to the quantity of the beams in the second beam set or the quantity of sets of the BF parameters used by the second node.

It needs to be noted that, for implementations and beneficial effects of the operations, refer to corresponding descriptions in the method embodiment shown in FIG. 6.

The processor 1601 in the communication apparatus 1600 is configured to read computer program code stored in the memory 1602, to perform the following operations:

receiving node configuration information and a first beam set of a first node from the first node through the communication interface 1603;

converting the first beam set into a second beam set of the apparatus based on the node configuration information, where the first beam set and the second beam set each include at least one beam; and sending the second beam set through the communication interface 1603.

In a possible implementation, the processor 1601 is configured to determine, based on the node configuration, to forward the first beam set to form the second beam set of the apparatus.

In another possible implementation, a beam multiplexing mode in the first beam set includes time division multiplexing or frequency division multiplexing, and a beam multiplexing mode in the second beam set includes spatial division multiplexing.

In another possible implementation, the node configuration information includes at least one of the following: forwarding configuration information, power control information, control information occasion information, N sets of beamforming BF parameter information supported by the apparatus, and frequency band amplification and suppression information of a second node, where N is greater than or equal to 1, the control information occasion information indicates a time-frequency resource location at which the apparatus receives control information from the first node, the BF parameter includes one or more of a phase offset, an amplitude, and an index, and the index indicates the phase offset and/or an amplitude parameter.

In another possible implementation, the forwarding configuration information includes at least one of the following: forwarding start time information, first duration information, first indication information, time forwarding pattern information of the apparatus, and direction forwarding pattern information of the apparatus. The first duration information indicates sending duration for which the apparatus sends a first beam in the second beam set by using a first BF parameter, the first indication information indicates a quantity of beams in the second beam set, and the time forwarding pattern information of the apparatus indicates time locations at which the apparatus forwards the second beam set from forwarding start time; and the direction forwarding pattern information of the apparatus indicates BF parameters used by the apparatus to forward the second beam set.

In another possible implementation, the quantity of the beams in the second beam set is equal to a quantity of sets of the BF parameters used by the apparatus, and the quantity of sets of the BF parameters used by the apparatus is less than or equal to N.

In another possible implementation, the forwarding start time information includes identifier information of a first beam in the first beam set, or a first interval and start OFDM symbol information. The identifier information of the first beam indicates that the apparatus starts to forward the second beam set from time corresponding to the first beam, the first interval indicates a quantity of slots between a slot in which the apparatus receives the node configuration information and a forwarding start slot, and the start OFDM symbol information indicates a forwarding start OFDM symbol in the forwarding start slot.

In another possible implementation, the first indication information includes at least one of the following: a subcarrier spacing, a frequency band, cell identifier information, and K, where K is greater than or equal to 1.

In another possible implementation, the time forwarding pattern information of the apparatus includes a first bitmap, and a bit in the first bitmap corresponds to a unit interval. When a value of a bit in the first bitmap is a first preset value, the processor 1601 is further configured to forward, through the communication interface 1603, a beam in the second beam set at a unit interval corresponding to the bit.

In another possible implementation, the direction forwarding pattern information of the apparatus includes a second bitmap, and a bit in the second bitmap corresponds to a set of BF parameters. When a value of a bit in the second bitmap is a second preset value, the processor 1601 is further configured to forward a beam in the second beam set through the communication interface 1603 and by using a set of BF parameters corresponding to the bit.

In another possible implementation, the control information occasion information includes at least one of the following: a time periodicity, a frequency domain resource block, a quantity of occupied orthogonal frequency division multiplexing OFDM symbols, and a time start location.

In another possible implementation, the node configuration information is carried in radio resource control RRC layer signaling, downlink control information DCI of a physical downlink control channel, or a media access control MAC control element CE.

In another possible implementation, the processor 1601 is further configured to receive system information SI from the first node through the communication interface 1603, where the SI includes index information of the at least one beam in the first beam set.

In another possible implementation, the processor 1601 is further configured to receive SI change indication information from the first node through the communication interface 1603.

In another possible implementation, the processor 1601 is further configured to continuously receive beams in the first beam set in time through the communication interface 1603.

In another possible implementation, a control plane protocol stack of the apparatus includes a radio resource control RRC layer, a media access control MAC layer, and a physical PHY layer.

It needs to be noted that, for implementations and beneficial effects of the operations, refer to corresponding descriptions in the method embodiment shown in FIG. 6.

The processor 1601 in the communication apparatus 1600 is configured to read computer program code stored in the memory 1602, to perform the following operations:

sending a first message to a first node through the communication interface 1603, where the first message is for requesting to establish a radio resource control RRC connection, the first message includes first indication information, and the first indication information indicates that a terminal that initiates the request for establishing the RRC connection is the apparatus;

receiving a second message from the first node through the communication interface 1603; and establishing the RRC connection to the first node based on the second message.

In a possible implementation, the first message includes second indication information, and the second indication information indicates identifier information of the apparatus.

In another possible implementation, the first message includes second indication information, and the second indication information indicates capability information of the apparatus.

In another possible implementation, the second indication information includes an information field, and a structure corresponding to the information field is used to define the capability information of the apparatus.

In another possible implementation, the second indication information includes a bit sequence, and the bit sequence indicates the capability information of the apparatus.

In another possible implementation, the second indication information includes an index value, and the index value indicates the capability information of the apparatus.

In another possible implementation, the second message includes a first value, and the processor 1601 is further configured to: generate a first response number based on the first value and a private key in a digital certificate; and send a third message to the first node through the communication interface 1603, where the third message includes the first response number, and the first response number is used by the first node to verify identity information of the apparatus.

In another possible implementation, the third message includes capability information of the apparatus.

In another possible implementation, the processor 1601 is further configured to: receive a capability inquiry message from the first node through the communication interface 1603; and send the capability information of the apparatus to the first node.

In another possible implementation, a control plane protocol stack of the apparatus includes a radio resource control RRC layer, a media access control MAC layer, and a physical PHY layer.

It needs to be noted that, for implementations and beneficial effects of the operations, refer to corresponding descriptions in the method embodiment shown in FIG. 11.

The processor 1601 in the communication apparatus 1600 is configured to read computer program code stored in the memory 1602, to perform the following operations:

receiving a first message from a second node through the communication interface 1603, where the first message is for requesting to establish a radio resource control RRC connection, the first message includes first indication information, and the first indication information indicates that a terminal that initiates the request is the second node; and sending a second message to the second node through the communication interface 1603.

In a possible implementation, the first message includes second indication information, and the second indication information indicates identifier information of the second node.

In another possible implementation, the first message includes second indication information, and the second indication information indicates capability information of the second node.

In another possible implementation, the second indication information includes an information field, and a structure corresponding to the information field is used to define the capability information of the second node.

In another possible implementation, the second indication information includes a bit sequence, and the bit sequence indicates the capability information of the second node.

In another possible implementation, the second indication information includes an index value, and the index value indicates the capability information of the second node.

In another possible implementation, the second message includes a first value, and the first value is used to verify identity information of the second node.

In another possible implementation, the processor 1601 is further configured to receive a third message from the second node through the communication interface 1603, where the third message includes a first response number. The processor 1601 is further configured to: obtain a public key of the second node, where the public key is preconfigured by a network management function OAM network element or is requested from an OAM network element; and verify the first response number based on the first value and the public key, to determine the identity information of the second node.

In another possible implementation, the third message includes capability information of the second node.

In another possible implementation, the processor 1601 is further configured to: send a capability inquiry message to the second node through the communication interface 1603; and receive the capability information of the second node from the second node.

It needs to be noted that, for implementations and beneficial effects of the operations, refer to corresponding descriptions in the method embodiment shown in FIG. 11.

The processor 1601 in the communication apparatus 1600 is configured to read computer program code stored in the memory 1602, to perform the following operations:

sending capability information of the apparatus to the first node through the communication interface 1603, where the capability information includes forwarding capability information of the apparatus.

In a possible implementation, the capability information further includes one or more of the following: a specification of the apparatus, frequency band amplification or outband suppression of the apparatus, and maximum uplink and downlink transmit power of the apparatus.

In another possible implementation, the forwarding capability information of the apparatus includes one or more of the following: a maximum quantity of beams capable of being forwarded by the apparatus, quantities of beams forwarded by the apparatus in different subcarrier spacings and/or different frequency bands, and the different subcarrier spacings and/or the different frequency bands supported by the apparatus.

It needs to be noted that, for implementations and beneficial effects of the operations, refer to corresponding descriptions in the method embodiment shown in FIG. 12.

The processor 1601 in the communication apparatus 1600 is configured to read computer program code stored in the memory 1602, to perform the following operations:

receiving capability information from a second node through the communication interface 1603, where the capability information includes forwarding capability information of the second node.

In a possible implementation, the capability information further includes one or more of the following: a specification of the second node, frequency band amplification or outband suppression of the second node, and maximum uplink and downlink transmit power of the second node.

In another possible implementation, the forwarding capability information of the second node includes one or more of the following: a maximum quantity of beams capable of being forwarded by the second node, quantities of beams forwarded by the second node in different subcarrier spacings and/or different frequency bands, and the different subcarrier spacings and/or the different frequency bands supported by the second node.

It needs to be noted that, for implementations and beneficial effects of the operations, refer to corresponding descriptions in the method embodiment shown in FIG. 12.

The processor 1601 in the communication apparatus 1600 is configured to read computer program code stored in the memory 1602, to perform the following operations:

receiving, from a first node through the communication interface 1603, physical random access channel PRACH configuration information dedicated to a second node, where the PRACH configuration information includes a first preamble; and sending the first preamble to the first node through the communication interface 1603.

In a possible implementation, the PRACH configuration information further includes a time-frequency domain location of a PRACH resource, and the processor 1601 is configured to send the preamble to the first node at the time-frequency domain location of the PRACH resource through the communication interface 1603.

It needs to be noted that, for implementations and beneficial effects of the operations, refer to corresponding descriptions in the method embodiment shown in FIG. 13.

The processor 1601 in the communication apparatus 1600 is configured to read computer program code stored in the memory 1602, to perform the following operations:

sending, to a second node through the communication interface 1603, physical random access channel PRACH configuration information dedicated to the second node, where the PRACH configuration information includes a first preamble; and receiving the first preamble from the second node through the communication interface 1603.

In a possible implementation, the PRACH configuration information further includes a time-frequency domain location of a PRACH resource, and the processor 1601 is configured to receive the preamble from the second node at the time-frequency domain location of the PRACH resource through the communication interface 1603.

It needs to be noted that, for implementations and beneficial effects of the operations, refer to corresponding descriptions in the method embodiment shown in FIG. 13.

The processor 1601 in the communication apparatus 1600 is configured to read computer program code stored in the memory 1602, to perform the following operations:

receiving, from a first node through the communication interface 1603, physical random access channel PRACH configuration information dedicated to a second node, where the PRACH configuration information includes a time-frequency domain location of a PRACH resource; and sending a preamble to the first node at the time-frequency domain location of the PRACH resource through the communication interface 1603.

It needs to be noted that, for implementations and beneficial effects of the operations, refer to corresponding descriptions in the method embodiment shown in FIG. 14.

The processor 1601 in the communication apparatus 1600 is configured to read computer program code stored in the memory 1602, to perform the following operations:

sending, to a second node through the communication interface 1603, physical random access channel PRACH configuration information dedicated to the second node, where the PRACH configuration information includes a time-frequency domain location of a PRACH resource; and receiving a preamble from the second node at the time-frequency domain location of the PRACH resource through the communication interface 1603.

It needs to be noted that, for implementations and beneficial effects of the operations, refer to corresponding descriptions in the method embodiment shown in FIG. 14.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be located in an ASIC. In addition, the ASIC may be located in a base station or a terminal. Certainly, the processor and the storage medium may alternatively exist in a base station or a terminal as discrete components.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, the procedures or functions in embodiments of this application are all or partially executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible by the computer, or a data storage device, for example, a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive. The computer-readable storage medium may be a volatile or non-volatile storage medium, or may include both a volatile storage medium and a non-volatile storage medium.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In the descriptions of this application, terms such as "first", "second", "S101", or "S102" are merely used for distinguishing between descriptions and conveniently describing the context. Different sequence numbers have no specific technical meaning, and cannot be understood as an indication or an implication of relative importance, or an indication or an implication of an operation execution sequence. An execution sequence of the processes should be determined based on functions and internal logic of the processes.

The term "and/or" in this application describes only an association relationship for associated objects, and indicates that three relationships may exist. For example, "A and/or B" may indicate the following three cases: Only A exists; both A and B exist; or only B exists. A and B may be singular or plural. In addition, the character "/" in this specification indicates an "or" relationship between the associated objects.

In this application, "transmission" may include the following three cases: data sending, data receiving, or data sending and data receiving. In this application, "data" may include service data and/or signaling data.

In this application, the terms "include" or "have" and any variation thereof are intended to cover non-exclusive inclusion. For example, a process/method that includes a series of steps, or a system/product/device that includes a series of units is not necessarily limited to those expressly listed steps or units, but may include other steps or units not explicitly listed or inherent to these processes/methods/products/devices.

In the descriptions of this application, unless otherwise specified, a quantity of nouns indicates "a singular noun or a plural noun", namely, "one or more". "At least one" indicates one or more. "At least one of the following: A, B, and C is included" may indicate that A is included, B is included, C is included, A and B are included, A and C are included, B and C are included, or A, B and C are included, where a, b, and c may be singular or plural.

What is claimed is:

1. A method applied to a second node, the method comprising:

receiving node configuration information and a first beam set of a first node from the first node, wherein the node configuration information comprises forwarding configuration information, wherein the forwarding configuration information comprises: forwarding start time information, wherein the forwarding start time information comprises a first interval and start orthogonal frequency division multiplexing (OFDM) symbol information, wherein the first interval indicates a quantity of slots between a slot in which the second node receives the node configuration information and a forwarding start slot, and the start OFDM symbol information indicates a forwarding start OFDM symbol in the forwarding start slot; and forwarding the first beam set to form a second beam set of the second node based on the node configuration information, wherein the first beam set and the second beam set each comprise at least one beam.

2. The method according to claim 1, wherein:

a beam multiplexing mode in the first beam set comprises time division multiplexing or frequency division multiplexing; and a beam multiplexing mode in the second beam set comprises spatial division multiplexing.

3. The method according to claim 1, wherein the node configuration information further comprises at least one of:

power control information;

control information occasion information, wherein the control information occasion information indicates a time-frequency resource location at which the second node receives control information from the first node;

N sets of beamforming (BF) parameter information supported by the second node, wherein N is greater than or equal to 1, wherein the BF parameter information comprises one or more of a phase offset, an amplitude, and an index, and the index indicates the phase offset or the amplitude; or frequency band amplification and suppression information of the second node.

4. The method according to claim 3, wherein the forwarding configuration information further comprises at least one of:

first duration information, wherein the first duration information indicates a sending duration for which the second node sends a first beam in the second beam set using a first BF parameter;

first indication information, wherein the first indication information indicates a quantity of beams in the second beam set;

time forwarding pattern information of the second node, wherein the time forwarding pattern information of the second node indicates time locations at which the second node forwards the second beam set from forwarding start time; or direction forwarding pattern information of the second node, wherein the direction forwarding pattern information of the second node indicates BF parameters used by the second node to forward the second beam set.

5. The method according to claim 4, wherein the first indication information comprises at least one of:

a subcarrier spacing;

a frequency band;

cell identifier information; or

K, wherein K is greater than or equal to 1 and less than or equal to N, wherein when the first indication information is K, the second node forwards K beams in the second beam set by using K sets of beamforming parameters.

6. The method according to claim 4, wherein the control information occasion information comprises at least one of:

a time periodicity;

a frequency domain resource block;

a quantity of occupied orthogonal frequency division multiplexing (OFDM) symbols; or a time start location.

7. The method according to claim 4, wherein:

the time forwarding pattern information of the second node comprises a first bitmap, and a bit in the first bitmap corresponds to a unit interval; and when a value of a bit in the first bitmap is a first preset value, the second node forwards a beam in the second beam set at a unit interval corresponding to the bit.

8. The method according to claim 1, wherein the node configuration information is carried in at least one of:

radio resource control (RRC) layer signaling;

downlink control information (DCI) of a physical downlink control channel; or a media access control (MAC) control element (CE).

9. The method according to claim 1, wherein a control plane protocol stack of the second node comprises a radio resource control (RRC) layer, a media access control (MAC) layer, and a physical (PHY) layer.

10. A method applied to a first node, the method comprising:

generating node configuration information, wherein the node configuration information comprises forwarding configuration information, wherein the forwarding configuration information comprises: forwarding start time information, wherein the forwarding start time information comprises a first interval and start orthogonal frequency division multiplexing (OFDM) symbol information, wherein the first interval indicates a quantity of slots between a slot in which a second node receives the node configuration information and a forwarding start slot, and the start OFDM symbol information indicates a forwarding start OFDM symbol in the forwarding start slot;

sending the node configuration information to the second node, wherein the node configuration information is used for conversion of a first beam set of the first node into a second beam set of the second node, and the first beam set and the second beam set each comprise at least one beam; and sending the first beam set.

11. The method according to claim 10, wherein:

a beam multiplexing mode in the first beam set comprises time division multiplexing or frequency division multiplexing; and a beam multiplexing mode in the second beam set comprises spatial division multiplexing.

12. The method according to claim 10, wherein the node configuration information further comprises at least one of:

power control information;

control information occasion information, wherein the control information occasion information indicates a time-frequency resource location at which the first node sends control information to the second node;

N sets of beamforming (BF) parameter information supported by the second node, wherein N is greater than or equal to 1, wherein the BF parameter information comprises one or more of a phase offset, an amplitude, and an index, and the index indicates the phase offset or the amplitude; or frequency band amplification and suppression information of the second node.

13. The method according to claim 12, wherein the forwarding configuration information further comprises at least one of:

first duration information, wherein the first duration information indicates a use duration of a first BF parameter, the use duration of the first BF parameter is equal to a sending duration of a first beam in the second beam set;

first indication information, wherein the first indication information indicates a quantity of beams in the second beam set;

time forwarding pattern information of the second node, wherein the time forwarding pattern information of the second node indicates a time location of a forwarded beam in the second beam set; or direction forwarding pattern information of the second node, wherein the direction forwarding pattern information of the second node indicates a BF parameter used for forwarding each beam in the second beam set.

14. The method according to claim 13, wherein the first indication information comprises at least one of:

a subcarrier spacing;

a frequency band;

cell identifier information; or

K, wherein K is greater than or equal to 1 and less than or equal to N, wherein when the first indication information is K, the first node explicitly indicates that a quantity of sets of beamforming parameters is K.

15. The method according to claim 13, wherein:

the time forwarding pattern information of the second node comprises a first bitmap, and a bit in the first bitmap corresponds to a unit interval; and when a value of a bit in the first bitmap is a first preset value, the second node forwards a beam in the second beam set at a unit interval corresponding to the bit.

16. A communication system, comprising:

a first node configured to send node configuration information and a first beam set to a second node; and the second node configured to:

receive the node configuration information and the first beam set, wherein the node configuration information comprises forwarding configuration information, wherein the forwarding configuration information comprises: forwarding start time information, wherein the forwarding start time information comprises a first interval and start orthogonal frequency division multiplexing (OFDM) symbol information, wherein the first interval indicates a quantity of slots between a slot in which the second node receives the node configuration information and a forwarding start slot, and the start OFDM symbol information indicates a forwarding start OFDM symbol in the forwarding start slot; and forward the first beam set to form a second beam set of the second node based on the node configuration information, wherein the first beam set and the second beam set each comprise at least one beam.

17. The system according to claim 16, wherein the node configuration information further comprises at least one of:

power control information;

control information occasion information, wherein the control information occasion information indicates a time-frequency resource location at which the second node receives control information from the first node;

N sets of beamforming (BF) parameter information supported by the second node, wherein N is greater than or equal to 1, the BF parameter information comprises one or more of a phase offset, an amplitude, and an index, and the index indicates the phase offset or the amplitude; or frequency band amplification and suppression information of the second node.

18. The system according to claim 17, wherein the forwarding configuration information comprises at least one of:

first duration information, wherein the first duration information indicates a sending duration for which the second node sends a first beam in the second beam set using a first BF parameter;

first indication information, wherein the first indication information indicates a quantity of beams in the second beam set;

time forwarding pattern information of the second node, wherein the time forwarding pattern information of the second node indicates time locations at which the second node forwards the second beam set from forwarding start time; and direction forwarding pattern information of the second node, wherein the direction forwarding pattern information of the second node indicates BF parameters used by the second node to forward the second beam set.

19. The system according to claim 18, wherein the first indication information comprises at least one of:

a subcarrier spacing;

a frequency band;

cell identifier information; or

K, wherein K is greater than or equal to 1 and less than or equal to N, wherein when the first indication information is K, the second node forwards K beams in the second beam set by using K sets of beamforming parameters.

20. The system according to claim 18, wherein:

the time forwarding pattern information of the second node comprises a first bitmap, and a bit in the first bitmap corresponds to a unit interval; and when a value of a bit in the first bitmap is a first preset value, the second node forwards a beam in the second beam set at a unit interval corresponding to the bit.

* * * * *